United States Patent [19]

Harmon, Jr. et al.

[11] Patent Number: 4,467,444

[45] Date of Patent: Aug. 21, 1984

[54] PROCESSOR UNIT FOR MICROCOMPUTER SYSTEMS

[75] Inventors: William J. Harmon, Jr., San Jose; John R. Mick, Cupertino, both of Calif.

[73] Assignee: Advanced Micro Devices, Inc., Sunnyvale, Calif.

[21] Appl. No.: 174,490

[22] Filed: Aug. 1, 1980

[51] Int. Cl.³ .............................................. G06F 9/00
[52] U.S. Cl. ...................................... 364/900; 364/736
[58] Field of Search ... 364/200 MS File, 900 MS File, 364/736

[56] References Cited

U.S. PATENT DOCUMENTS

| | | | |
|---|---|---|---|
| 3,840,861 | 10/1974 | Amdahl et al. | 364/200 |
| 3,931,615 | 1/1976 | Oliver et al. | 364/900 |
| 4,041,461 | 8/1977 | Kratz et al. | 364/200 |
| 4,041,471 | 8/1977 | Krossa et al. | 364/200 |
| 4,112,490 | 9/1978 | Pohlman et al. | 364/200 |
| 4,165,534 | 8/1979 | Dummermuth et al. | 364/900 |
| 4,172,289 | 10/1979 | Struger et al. | 364/900 |

Primary Examiner—Eddie P. Chan
Attorney, Agent, or Firm—Patrick T. King; Gary T. Aka; Robert Bennett

[57] ABSTRACT

A processor, used in microcomputer systems for performing data processing functions, includes an arithmetic-logic unit having three operand inputs to provide the capability of executing, in addition to typical arithmetic and logic operations, complex three-operand instructions in a single clock (instruction) cycle.

15 Claims, 21 Drawing Figures

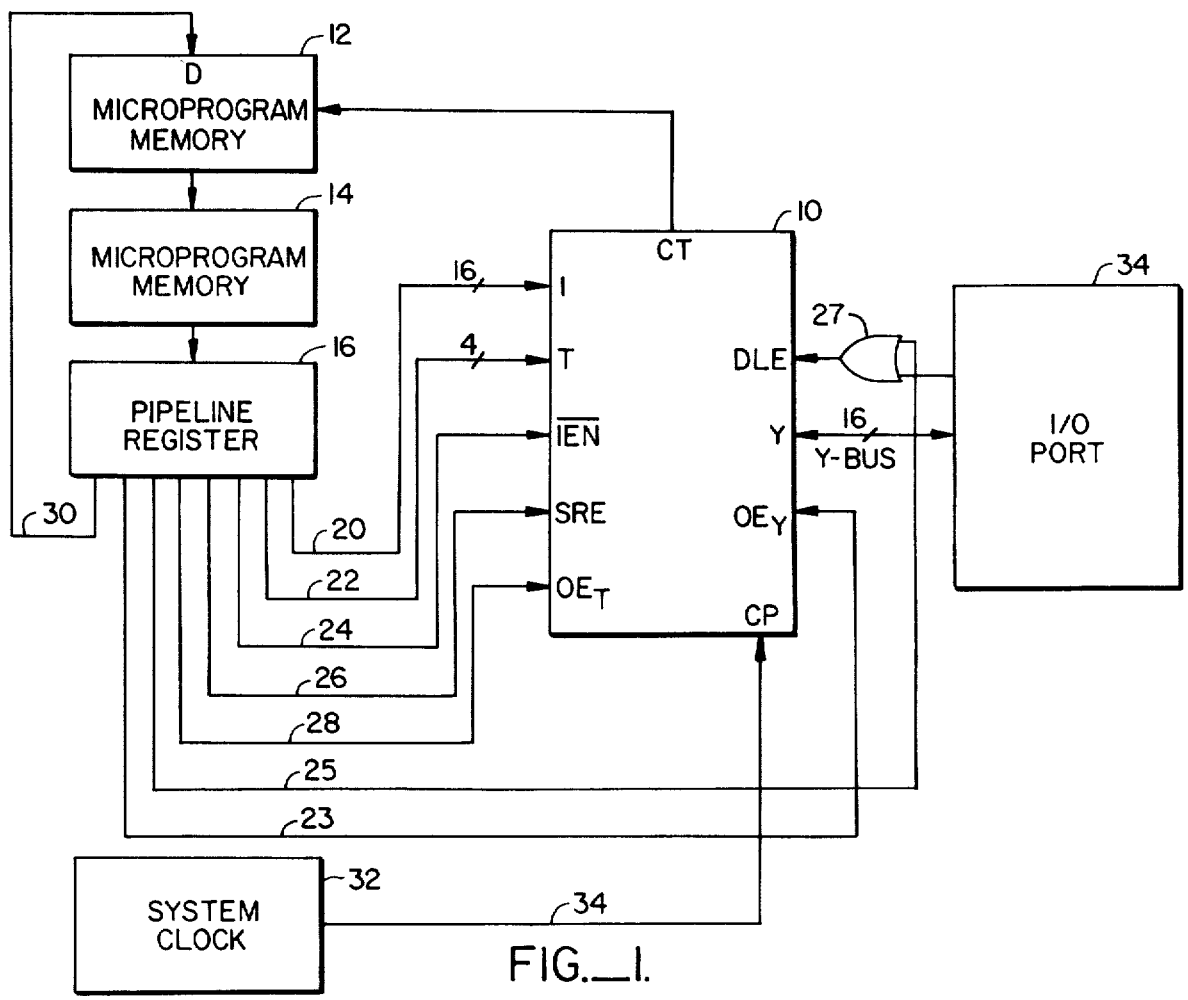
FIG._1.
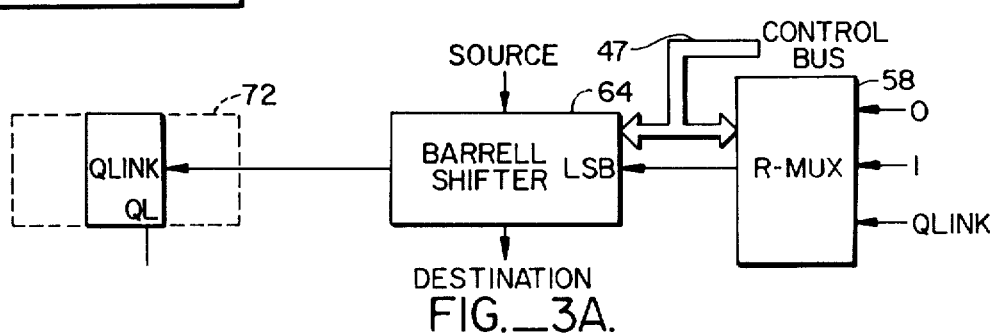
FIG._3A.
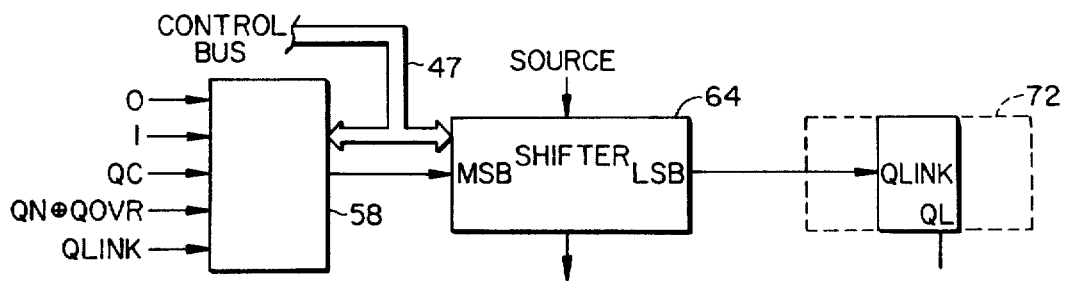
FIG._3B.

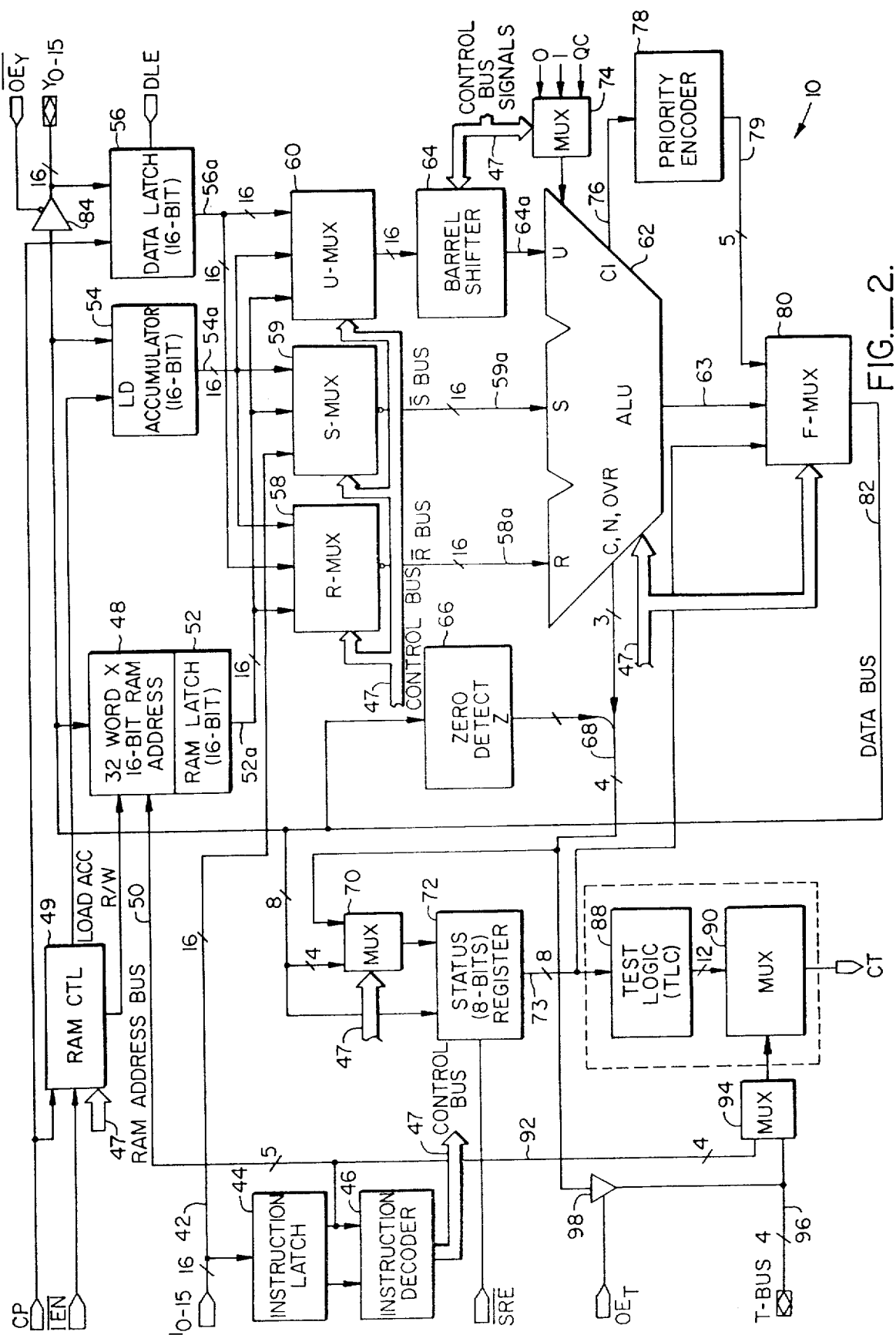
FIG._2.

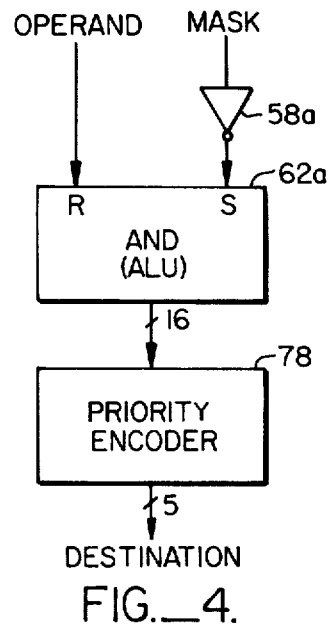
FIG._4.
| WORD MODE | | BYTE MODE* | |
|---|---|---|---|
| HIGHEST-PRIORITY ACTIVE BIT | ENCODER OUTPUT | HIGHEST-PRIORITY ACTIVE BIT | ENCODER OUTPUT |
| NONE | 0 | NONE | 0 |
| 15 | 1 | 7 | 1 |
| 14 | 2 | 6 | 2 |
| . | . | . | . |
| . | . | . | . |
| . | . | . | . |
| 1 | 15 | 1 | 7 |
| 0 | 16 | 0 | 8 |
FIG._5A.   *BITS 8-15 DO NOT PARTICIPATE
FIG._5B.
EXAMPLE: N=4, WORD MODE
```
SOURCE       0 0 0 1   0 0 1 1   0 1 1 1   1 1 1 1
DESTINATION  0 0 1 1   0 1 1 1   1 1 1 1   0 0 0 1
```
EXAMPLE: N=4, BYTE MODE
```
SOURCE       0 0 0 1   0 0 1 1   0 1 1 1   1 1 1 1
DESTINATION                      1 1 1 1   0 1 1 1
```
FIG._6.

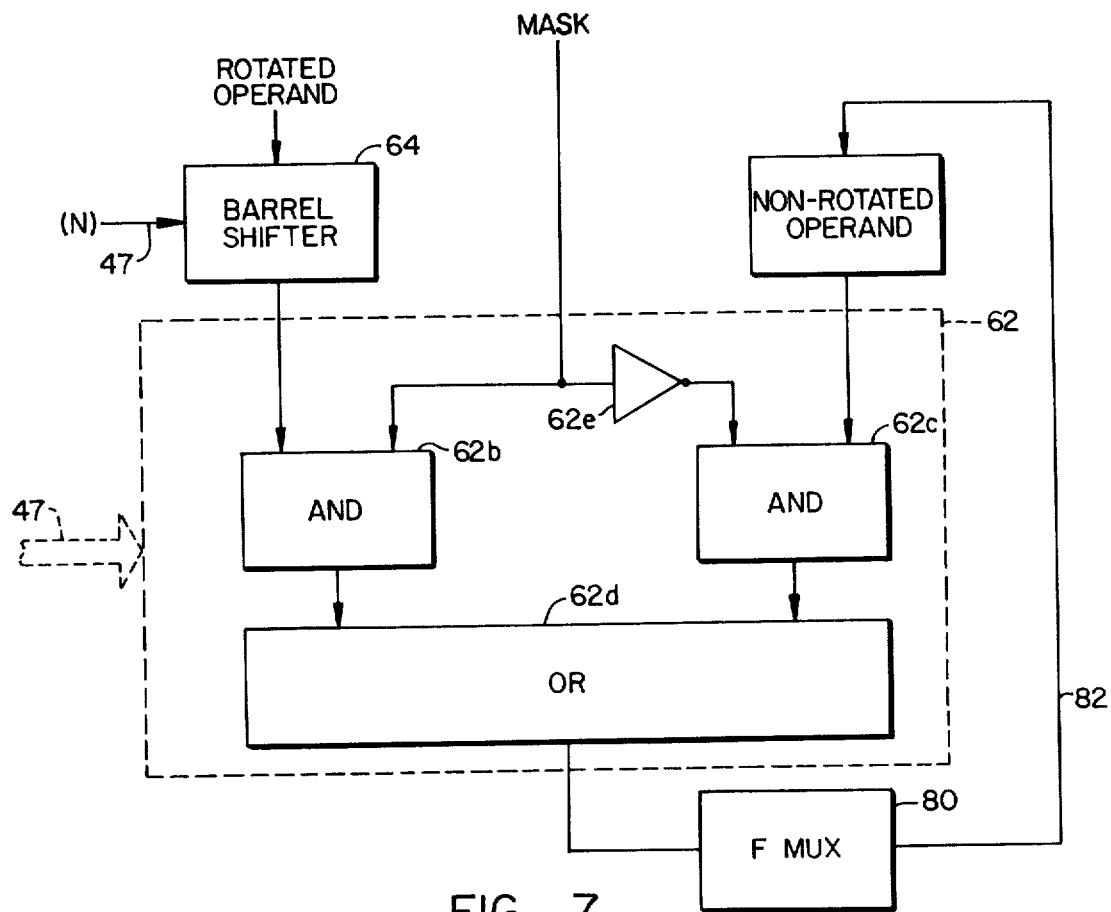
FIG._7.
EXAMPLE: N=4, WORD MODE
| BARREL SHIFTER INPUT | 0 0 1 1 | 0 0 0 1 | 0 1 0 1 | 0 1 1 0 |
|---|---|---|---|---|
| ROTATED OPERAND | 0 0 0 1 | 0 1 0 1 | 0 1 1 0 | 0 0 1 1 |
| NON-ROTATED OPERAND | 1 0 1 0 | 1 0 1 0 | 1 0 1 0 | 1 0 1 0 |
| MASK | 1 1 1 1 | 0 0 0 0 | 1 1 1 1 | 0 0 0 0 |
| DESTINATION | 0 0 0 1 | 1 0 1 0 | 0 1 1 0 | 1 0 1 0 |
FIG._8.

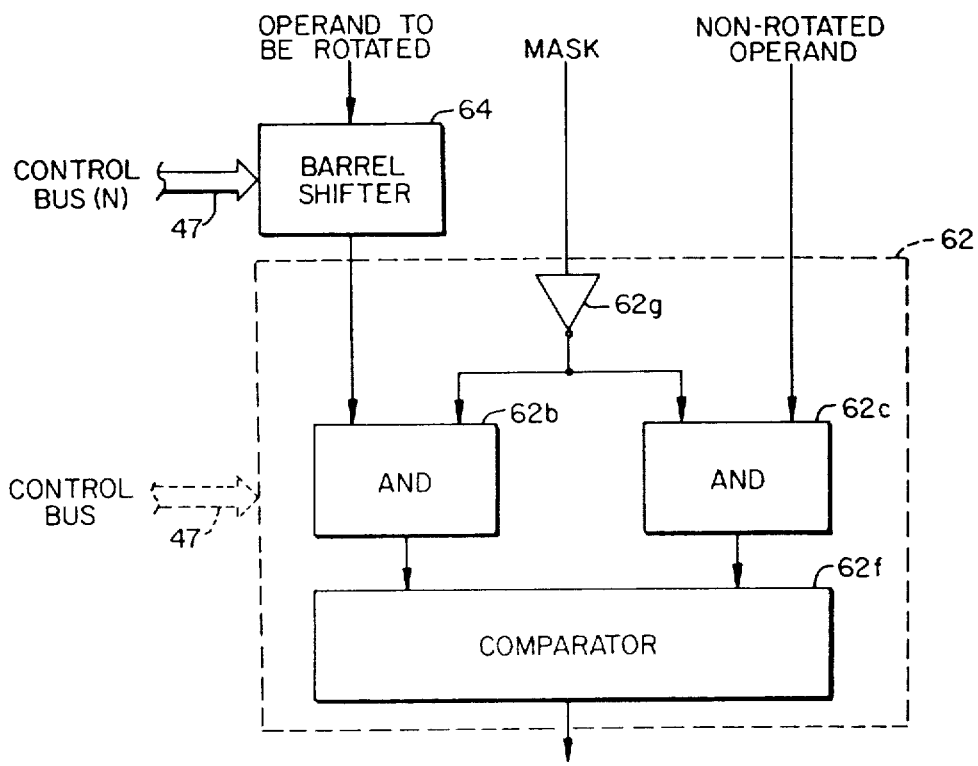
FIG._9.
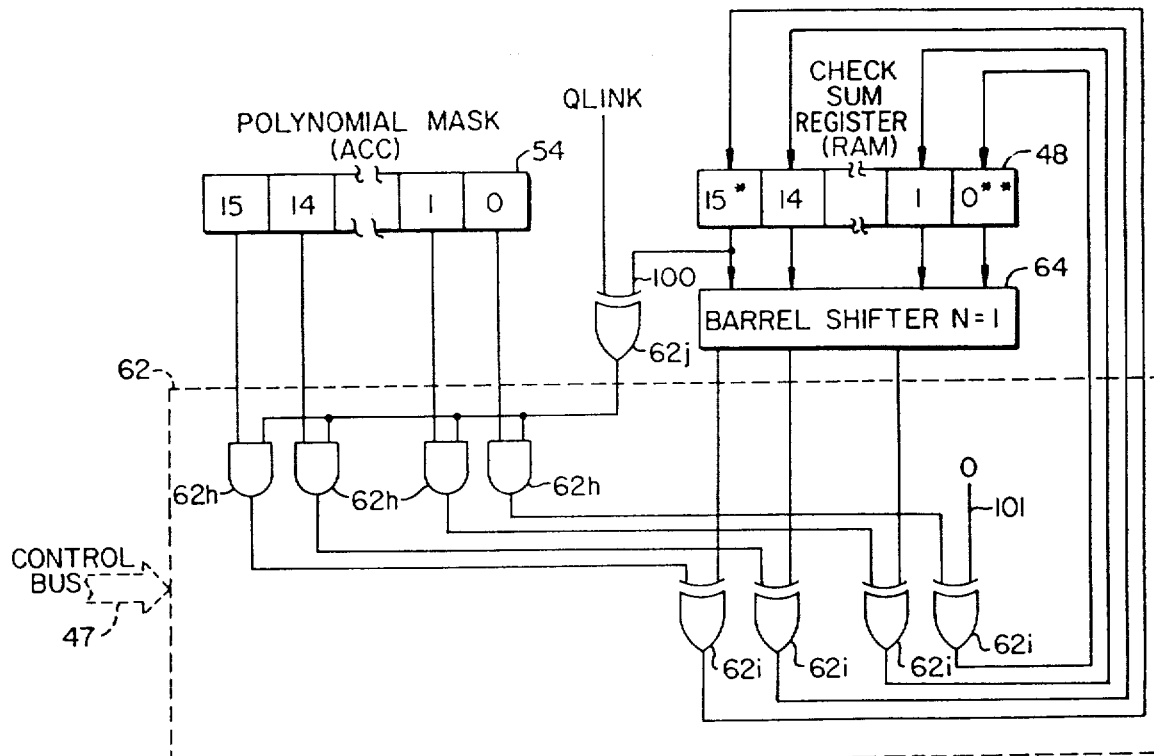
FIG._11A.

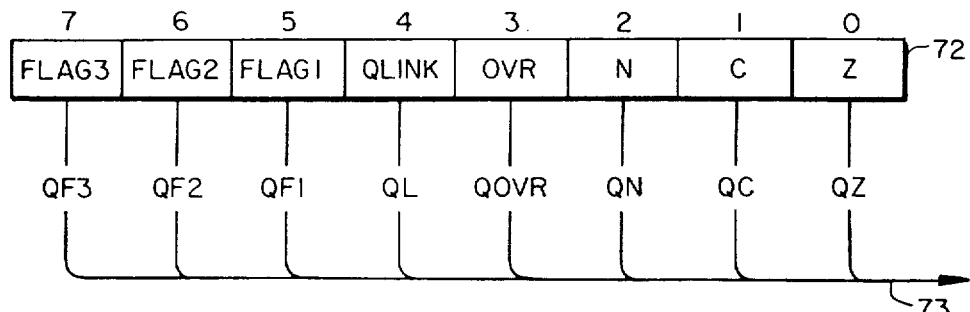
FIG._12.
EXAMPLE: N=4, WORD MODE
| | | | | |
|---|---|---|---|---|
| SHIFTER INPUT (U) | 0 0 1 1 | 0 0 0 1 | 0 1 0 1 | 0 1 1 0 |
| U ROTATED | 0 0 0 1 | 0 1 0 1 | 0 1 1 0 | 0 0 1 1 |
| R | 0 0 0 1 | 0 1 0 1 | 1 1 1 1 | 0 0 0 0 |
| MASK (S) | 0 0 0 0 | 0 0 0 0 | 1 1 1 1 | 1 1 1 1 |
Z (STATUS) = 1
FIG._10.
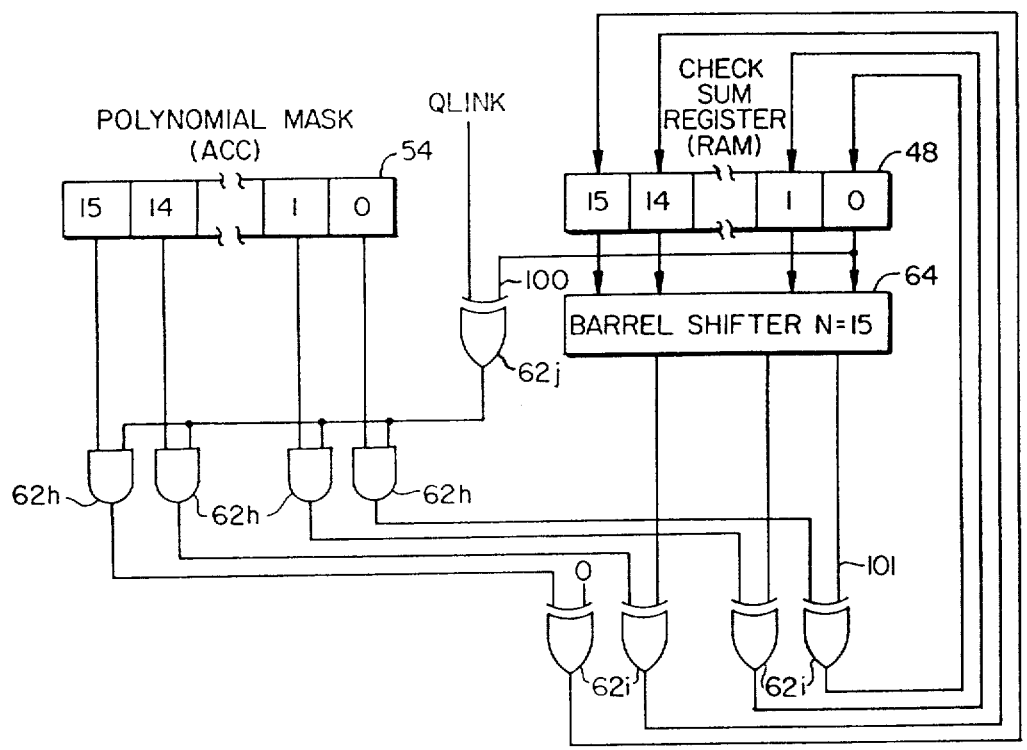
FIG._11B.

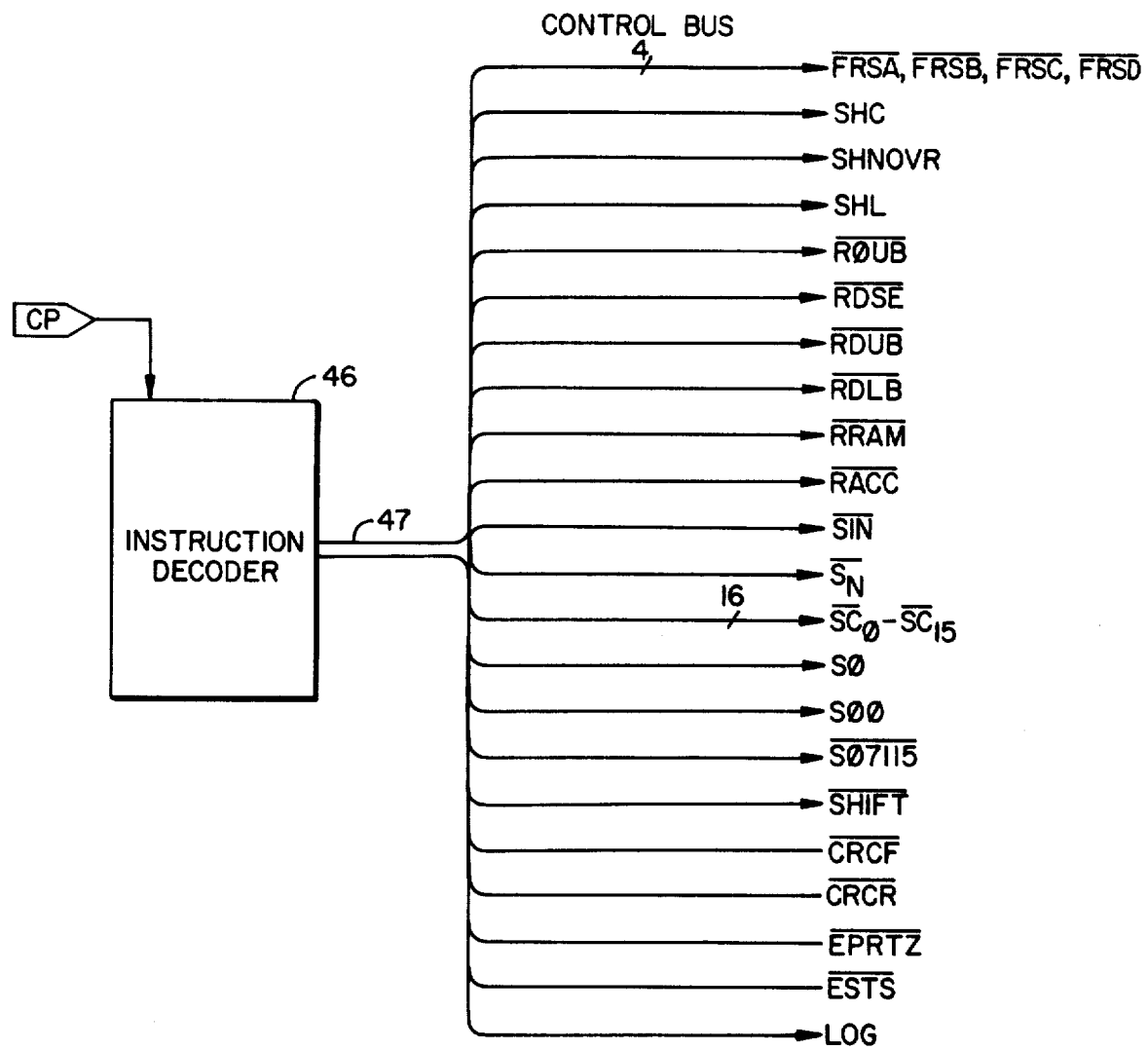
FIG._13.

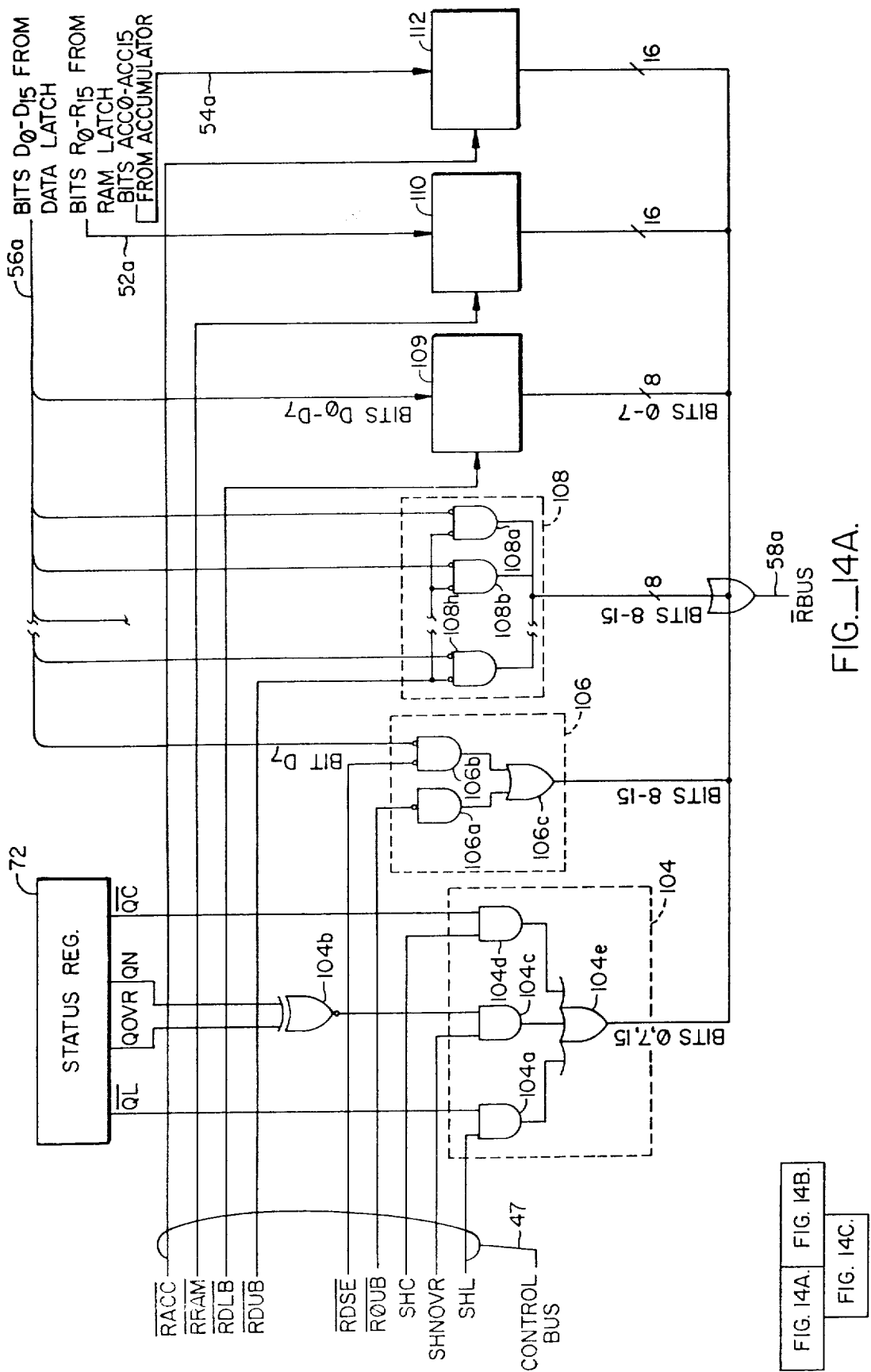

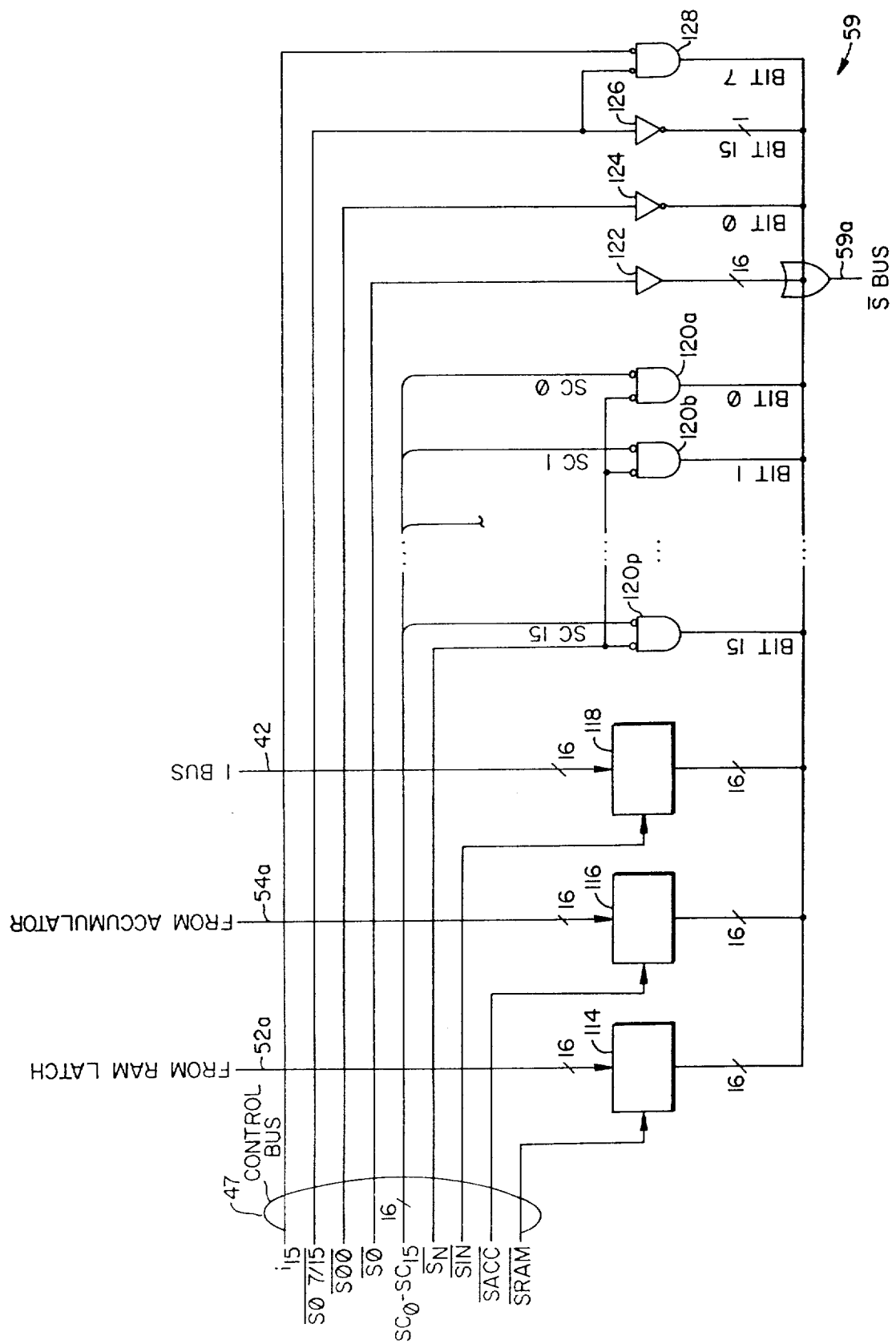
FIG._14B.

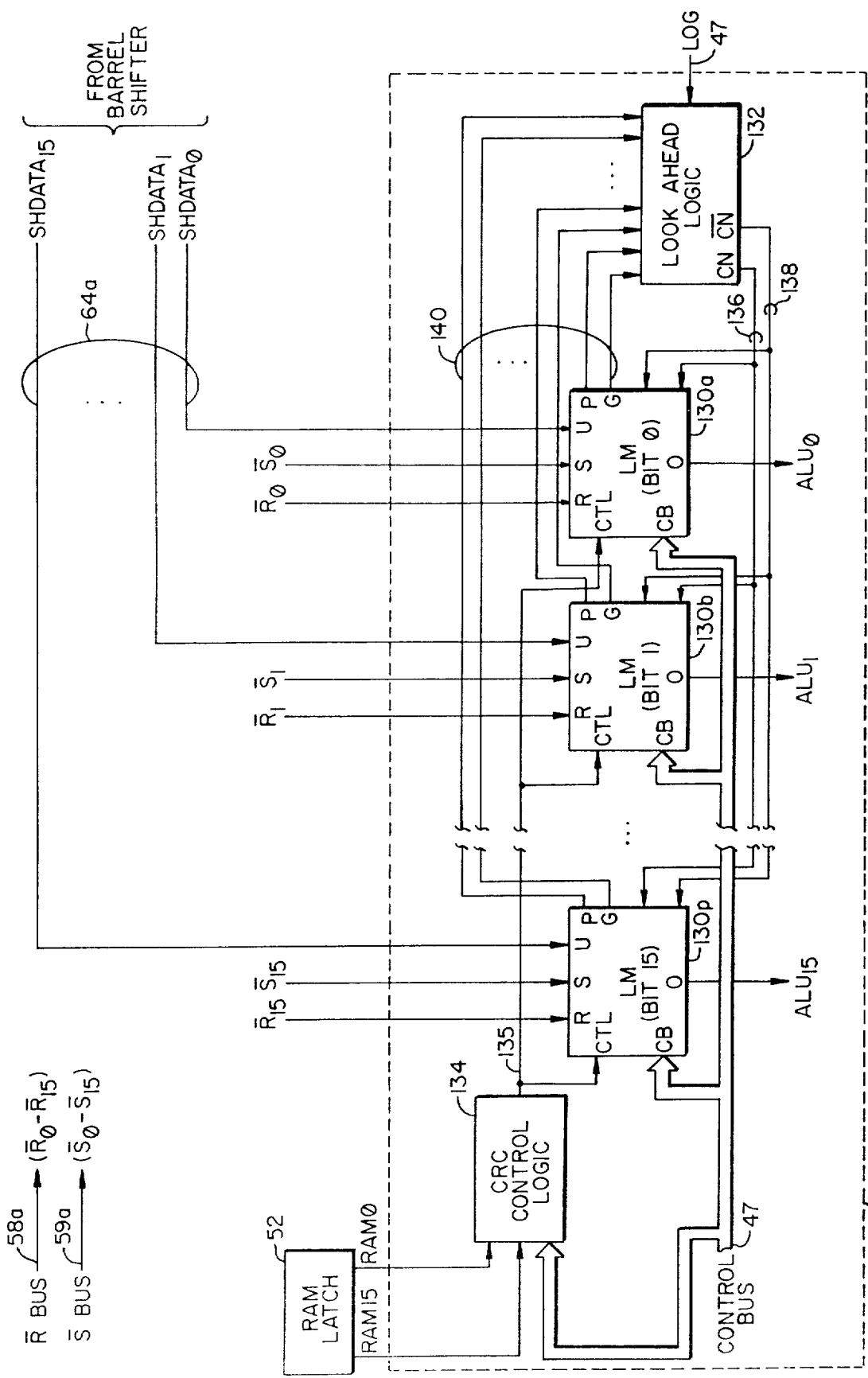
FIG._14C.

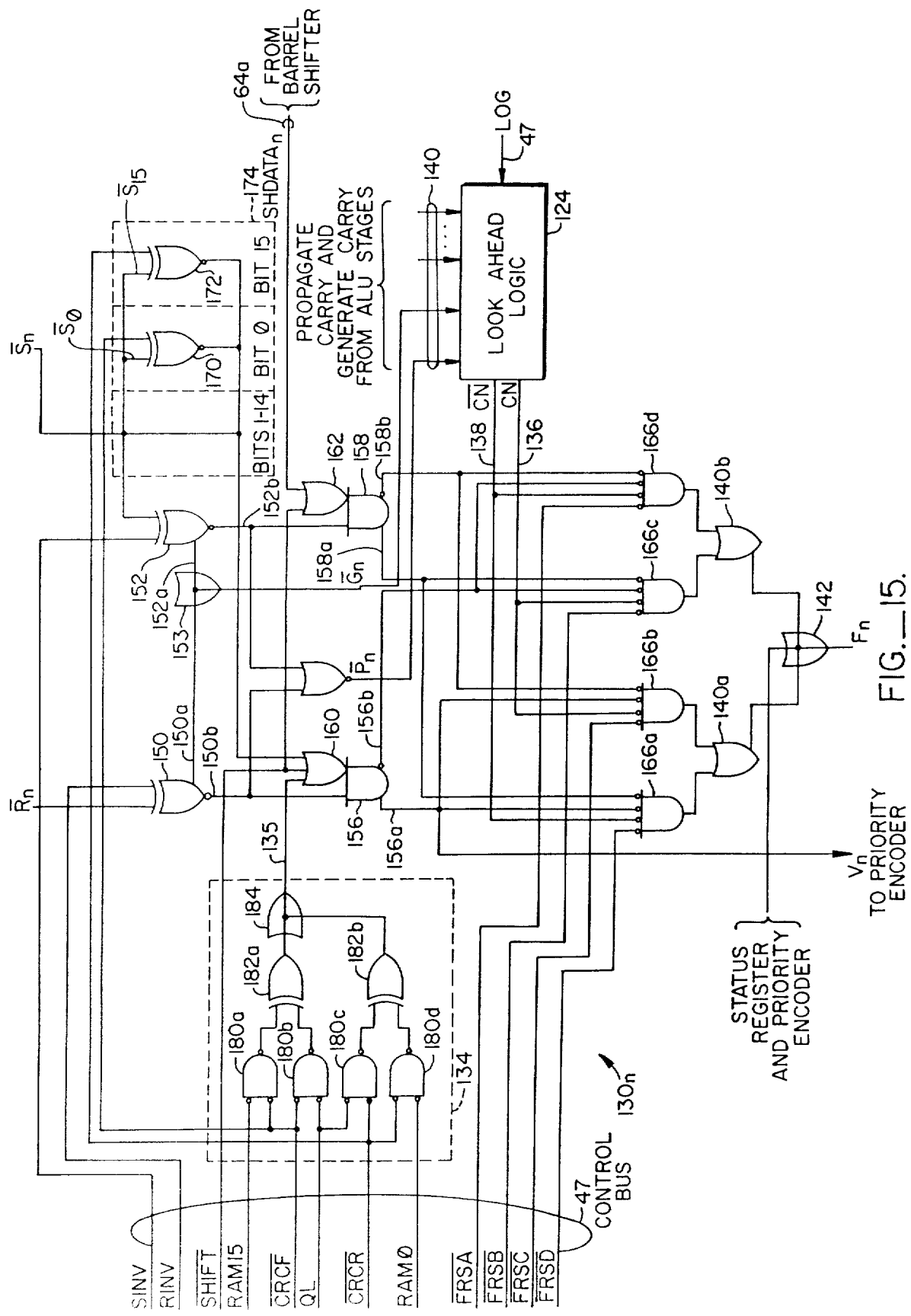
FIG._15.

PROCESSOR UNIT FOR MICROCOMPUTER SYSTEMS

This invention relates generally to a processor unit for use in a microcomputer system and more particularly to a high speed, high performance unit capable of performing complex data manipulations in one clock cycle, yet can be fabricated as a single semiconductor integrated circuit.

BACKGROUND OF THE INVENTION

Recent semiconductor fabrication techniques have provided for the packaging of complex digital circuits for use as building block elements in microcomputer systems. Recent advances in semiconductor technology have provided fabrication techniques that realize a marked increase in digital circuit (AND or OR gates, flip flops, etc.) density on single semiconductor elements or "chips" as they are called. In turn, this increase in circuit density has given rise to the microcomputer system era, an era in which a data handling and/or processing system can be built with a very few number of circuit elements.

These microcomputer systems have been found to be particularly useful in the data processing and digital system art. For example, today's large scale data processing systems are capable of operating at extremely high speeds. Unfortunately, the operating speed can often be limited by the necessity of transferring data and instructions to and from external devices (peripheral units) that connect the data processing system to the outside world. Older systems would often require the host computer of the data processor system to exert complete control over the peripheral unit to effect such data and instruction transfers and to see to proper operation of the peripheral. Today, such control is being built-in to the peripheral device by providing it with microcomputer system circuitry that allows the peripheral to handle much of its own control functions with a minimum of influence from a host processor.

Thus, by providing the peripheral units of a data processing system with "intelligence" via a microcomputer system, the ability of the peripheral to control its own functions is made somewhat easier. Too, the host computer is relieved of many of the peripheral control functions. However, the simplicity and speed with which control operations are implemented become critical. If the overall data processing system with which the peripheral is used is kept waiting for a data or instruction transfer, speed of the overall system is impaired.

In modern data processing systems, data is continuously transferred between the host processor and its peripherals, storage, or terminals, such data often including coded control words that must be assembled or disassembled by the peripheral. Thus, packing or unpacking these coded data words, which may be binary-coded decimal (BCD) or American Standard Code of Information Exchange (ASCII) may be necessary. Typically, such packing and unpacking utilizes a rotation (i.e., a realignment of the bits of the coded work) and merge (logically ANDing the realigned coded word with a mask to pass only the desired bits and inhibit or strip away the unwanted bits) functions. Rotate and compare functions (similar to rotate and merge) are also widely used to compare a number of bits of a control or status data word with a predetermined known. These functions, when implemented in many present microprocessor systems that provide "intelligence" to the peripheral, require complex programming and an inordinate amount of processing time.

Further, errors may be introduced during the reading, writing or actual transmission of the data. Consequently, error control has become an integral part of the design of many of the peripheral units and their host computers. One of the more preferred methods today for error detection involves the addition of one or more bits, called "redundancy" bits, to the information carrying bits of a character or stream of chracters. For example, one method commonly used for error detection is the simple parity check. A far more powerful error detecting method is cyclic redundancy checking (CRC), a relatively complex but far more powerful error detection technique that utilizes formation of a "checking polynomial, numerous shifting, and checks that are made during data transmission. Again, as with the rotate and merge and rotate and compare functions, CRC error checking techniques can be implemented by present microprocessor systems at the expense of processing time.

Peripheral controllers can be construction as an integrated circuit; that is, custom designed to fit the particular characteristics of the data processing system and its interface requirement with the particular peripheral unit. However, production in low quantity of integrated circuits can be exorbitant and, therefore, commercially unattractive. Further, circuit complexity can often be increased to the point where the particular chip becomes "pin limited;" that is, the number of pins necessary to provide the integrated circuit with the appropriate data, instruction and control information can increase to a prohibitive number, in turn greatly increasing production costs and expense to the consumer. Preferably, large scale or very large scale integration should produce a semiconductor package having as few pins as possible. Further still, in order to produce a microprocessor system at a relatively inexpensive cost to the consumer, the system should be able to function in an almost unlimited number of circumstances.

Today's microcomputers are typically fabricated using metal-oxide-silicone (MOS) or bipolar semiconductor fabrication techniques. MOS has the advantage of achieving higher circuit density than bipolar fabricated circuits. However, bipolar circuitry is capable of much higher operating speed—particularly when the circuits are formed using the current-switching technique of emitter-coupled-logic (ECL). Accordingly, if the microcomputer system is to be capable of high performance and high speed, the circuit structure is preferably ECL, if possible.

Today's ECL microcomputer systems are usually constructed using several building block elements that can be thought of as forming essentially two distinct sections: a control section, including a memory containing microinstructions, for controlling operation of the microcomputer system in response to sequences of microinstructions, and a data manipulation section, which includes a processor containing an arithmetic-logic unit (ALU), that performs the required operation (i.e., arithmetic, logical, shifting, etc.) on the data to be processed.

The speed of operation of the processor, and therefore the microcomputer system itself, depends in large part on the architecture of its internal circuitry. Throughput (the time it takes for an instruction to be executed) depends, in part, upon the number of gates data must pass through during its manipulation (instruction execution). Also, operating speed can be increased by combining several operations into one instruction. For example, certain high-speed (ECL) processors available today provide a (one-bit) shift function to be performed with other (logical) operations by placing a shifter on the output of the processor ALU. Thus, a logic operation and a shift (such as may be required in executing a CRC operation) can be performed in one instruction cycle, rather than two or more, and the operating speed of the microcomputer system is thereby increased. However, the shift circuit, being on the output of the ALU, is always in the data path and, when not used, thereby increases the time it takes for the data to pass through the manipulation cycle; that is, overall throughput time is increased.

SUMMARY OF THE INVENTION

The present invention provides a processor for use in bipolar microcomputer systems with an arithmetic-logic unit (ALU) that is capable of receiving and simultaneously combining three operands so that complex instructions can be performed in a single instruction cycle. The ALU is structured to have three operand inputs, with a shifter circuit connected to one of the operand inputs. So structured, the ALU provides the processor with the capability of executing conventional instruction types—such as pass, complement, twos complement, add, subtract, AND, NAND, OR, NOR, EX-OR, and EX-NOR. In addition, the ability to simultaneously receive and combine three operands, coupled with the shifting capability at one operand input, allows the ALU to execute 3-operand instructions, such as, for example, rotate and merge, rotate and compare with mask, and the like, in a single instruction cycle.

In the preferred embodiment, the processor of the present invention is adapted to operate in a microcomputer system that includes a memory unit containing 16-bit instruction words that are accessed by addresses supplied thereto by a high speed microprogrammed sequencer unit.

The processor includes an arithmetic logic unit (ALU) that receives operands, in the form of multi-bit data words, on one or more of three operand inputs from a variety of sources. Among the sources for the operands are a 32-word by 16-bit random access memory (RAM), a 16-bit accumulator register, and a 16-bit input data latch. These storage sources, together with data lines that communicate data words from an outside source, are multiplexed to selectively communicate one or more operands to a corresponding operand input of the ALU in accordance with the particular instruction commanding the processor unit's operation.

Interconnecting one of the operand inputs of the ALU with the multiplexer is a barrel shifter circuitry, a combinational logic array capable of rotating (i.e., circular shifting) a received 16-bit data word 0–15 places. The barrel shifter is also used to perform single-bit shift, either up or down. The information used to fill vacated bit position, during single-bit shifts, is applied to one operand input of the ALU, the shifted word supplied to another operand input of ALU, and the two operands merged, performing a single-bit shift and fill operation in one instruction execution.

The processor device operates in response to a clock signal supplied to an input terminal and 16 bit instructions that are received and decoded by a decoder circuit which, in turn, issues a plurality of gating signals on a control bus to select and guide operands through the ALU to obtain the result specified by the received instruction. In addition, the processor device is structured to operate in an 8-bit byte or a 16-bit word mode so that the selection and gating functions performed by the control signals that issue from the decode circuit select and gate the appropriate number of operand bits to and through the ALU.

When arithmetic operations are performed by the ALU, operands are received at only two of the operand inputs, and the data path that includes the barrel shifter is not used. The ALU includes full look-ahead logic to provide for the execution of arithmetic operations at the highest possible speed. When shifting is to be performed, however, the look-ahead logic is disabled and operands to be shifted are applied to the barrel shifter and then to an ALU operand input. Other operand inputs of the ALU receive a mask operand, a compare operand, or an operand to be merged with the shifted operated, depending upon the particular instruction, thereby executing complex instructions with a single pass through the ALU and in one instruction cycle. Results of any operation are selectively stored in any one (or more) of the storage facilities described above.

This invention is pointed out with particularity in the appended claims. An understanding of the above and further objects and advantages of this invention may be obtained by referring to the following description taken in conjunction with the drawings.

BRIEF DESCRIPTION OF THE DRAWINGS

FIG. 1 illustrates a microprocessor system utilizing the processor device of the present invention;

FIG. 2 is a block diagram of the processor device of the present invention;

FIGS. 3A and 3B are diagramatic illustrations of the shift instruction executed by the processor device of FIG. 2;

FIG. 4 diagrammatically illustrates the operation performed by the processor device of the present invention in response to a prioritize instruction;

FIGS. 5A and 5B are tables illustrating the priority encoder output in response to a proiritize instruction;

FIG. 6 is a table illustrating by example the execution of the Rotate by N instruction;

FIG. 7 is a block diagram that diagrammatically illustrates execution of the Rotate and Merge in by the processor device of FIG. 1;

FIG. 8 is a table illustrating by example the execution of Rotate and Merge instruction;

FIG. 9 is a block diagram that diagramatically illustrates the Rotate and Compare instruction execution by the processor device of FIG. 2;

FIG. 10 is a Rotate and Compare example;

FIGS. 11A and 11B are block diagrams respectively diagrammatically illustrating the functions performed by the CRC forward CRC reverse instructions;

FIG. 12 illustrates the bit assignments of the status byte contained in the status register of the present invention;

FIG. 13 illustrates certain of the control signals that emanate from the decode circuit and are communicated by the control bus to other circuit elements of the processor device of FIG. 2;

FIG. 14 diagramatically illustrates how FIGS. 14A, 14B and 14C fit together;

FIGS. 14A and 14B are, respectively, the schematics of the R and S multiplexer units for the processor unit shown in in FIG. 2;

FIG. 14C schematically illustrates, in part, the arithmetic-logic unit (ALU) of the processor device of FIG. 2;

FIG. 15 is a schematic of one station of the ALU shown in FIG. 14C.

DESCRIPTION OF AN ILLUSTRATIVE EMBODIMENT

A. General Description

The processor of the present invention is preferably intended for use in microprogrammed systems, particularly peripheral controllers, although it is also suitable for use in communication controllers, industrial controllers, digital modems, and other microprogrammed processor applications. The processor is structured to be fabricated in integrated circuit form as a single-package component to be used with other components to form a microcomputer system. In addition to its complete arithmetic and logic set, as will be seen below, the processor instruction set and architecture permit data processing functions that are particularly useful in controller applications. These range from single operand instructions, for example, bit set, bit reset, bit test, up through three-operand instructions such as rotate-and-merge, rotate-and-compare-with-mask, and cyclic-redundancy-check (CRC) generation. The architecture of the processor provides the capability of performing each of these instructions in a single clock (instruction) cycle.

FIG. 1 illustrates a simplified microcomputer system incorporating a processor 10 constructed in accordance with the teachings of the present invention. The system also includes a microprogram memory sequencer 12 which generates addresses that are coupled to a microprogram memory 14 which contains the microprogram for controlling both the processor 10 and the sequencer 12. The sequence of instruction words, which are read from the microprogram memory 14 in response to the addresses supplied by the microprogram sequencer 12, are applied to a pipeline register 16. The microprogram sequencer 12 shown in FIG. 1 may be implemented by an integrated circuit sold by the assignee herein and identified by part No. AM2910 (called a Microprocessor Controller).

Interconnecting the pipeline register 16 and the processor 10 is a 16-bit bus 20, a 4-bit T-bus 22, and 3 control lines 24, 26 and 28 which respectively supply control signals to the input enable (OVS/IEN/ ), status register enable (SRE) and T-bus output enable (OE$_T$) terminals of the processor unit 10. The pipeline register also supplies control lines 23 and 25 to the output enable (OVS/OE/$_y$) and data latch enable (DLE) inputs of processor 10. The control line 25 is ORed with another signal by OR gate 27. The pipeline register is also connected to the inputs (D) of the sequencer 12 via a bus 30.

The microprocessor system of FIG. 1 also includes a system clock 32 which generates the various clock and timing signals used by the other elements of the system including (preferably) a 10 MHz clock signal that is supplied to the clock pulse (CP) terminal of the processor device via the signal line 34.

An input-output (I/O) port 33 is provided as the interconnecting link between the microcomputer system of FIG. 1 and the outside world. Data is transferred between the I/O port 33 and the processor 10 on a 16-bit Y bus which is connected to the Y input of the processor. As will be seen, the Y terminals of the processor device 10 are threestate outputs that facilitate input-output bus organization, such as illustrated here, controlled by the signal applied to the output enable (OVS/OE/$_y$) terminal of processor 10.

Briefly, multibit instruction words are sequentially read from the microprogram memory 14 in response to address signals provided by the microprogram sequencer 12. Each multibit instruction word (including a 16-bit instruction word for the processor device 10) is latched in the pipeline register 16. A certain number of the bits now contained in the pipeline register 16 are returned (in parallel) to the D inputs of the sequencer 12 as instruction information. Certain other of the bits appear as control signals on the control lines 24, 26 or 28 or as a four bit signal supplied to the T-bus 22; and 16 of the bits held in the pipeline register 16 are supplied to the instruction input terminals I of the processor 10 as an instruction word.

It will be realized by those skilled in the art that the microcomputer system of FIG. 1 is only a simplistic illustration of the use of the processor 10. In actual practice, additional circuit components will be added to increase performance and data handling capability.

B. Processor Unit

The processor 10 is shown in greater detail in FIG. 2. The 16-bit instruction words placed on the bus 20 (FIG. 1) are received at the 16 instruction input terminals $I_\phi$–$I_{15}$ of the processor 10 and conducted therefrom by instruction bus (I BUS) 42 to an instruction latch 44. In most cases, the instruction latch 44 appears transparent to the 16-bit instruction words and functions as a conduit to apply the received instruction words directly to the instruction decoder 46. As mentioned, all instruction types are executed in a single clock cycle-except for the immediate instruction type, which requires two clock cycles. With regard to immediate instructions, during the first clock cycle, the instruction word is decoded, recognized, and temporarily latched in the instruction latch 44 for continued application to the instruction decoder 46. During the second clock cycle of an immediate instruction execution, the signals received at the instruction input terminals $I_\phi$–$I_{15}$ are used as one of the operands for the function specified by the instruction received and stored in the instruction latch 44. At the end of the second clock cycle the instruction latch 44 is returned to its transparent state.

The instruction decoder 46, consists of combinatorial logic functions to decode the instruction words and generate therefrom internal control signals that are conducted to the other elements of the processor 10 to perform the gating and control necessary for execution of the instruction word. These control signals are conducted on a control bus 47. The nature of many of the control signals will become intuitively obvious to those skilled in this art after discussion of the controlled element or circuit and the individual instruction words. However, some of the generated control signals are explained in greater detail with reference to FIG. 13 and following figures below, to insure an understanding of the controlled element or circuit and, in turn, the present invention.

A 5-bit portion of the 16-bit instruction word that is passed through the instruction latch 44 is coupled to the address circuits (not shown) of a 32-word by 16-bit random access memory (RAM) 48 via a 5-bit RAM address bus 50. A 16-bit RAM latch 52 is situated at the output of the RAM 48 for receiving and temporarily holding data read from the RAM 48. When the operand to be used for execution of an instruction is obtained from one of the memory locations of RAM 48, it is read from the RAM and stored in the 16-bit latch 52 for use.

The state of the signal on the read-write (R/W) signal line applied to the RAM 48 dictates whether data is to be written into or read from the memory location specified by the address signals on the RAM address bus 50. The R/W signal line emanates from a RAM control (RAM CTL) circuit 49 which receives as inputs the clock signal received at the CP input terminal of the processor 10. The RAM CTL circuit also receives the input enable signal, OVS/IEN/, and certain of the control signals conducted on the control bus 47 from the instruction decoder 46. Data will be written into the RAM 48 if the OVS/IEN/ input is LOW (and if the instruction being executed specifies the RAM 48 as the destination of the results of the operation), thereby providing some external control over what information is stored in the RAM 48. For byte instructions, only the lower 8 RAM bits (i.e., bits $\phi$–7) are written into; for word instructions, all 16 RAM bits are written into.

The RAM CTL circuit 49 also controls an accumulator register 54 by issuing load signals on a LOAD ACC signal line tied to the LD input of the accumulator register. The accumulator register will accept and latch data applied thereto when the signal applied to the OVS/IEN/ input terminal is HIGH and if the instruction being executed defines the accumulator register 54 as the destination of the operation. Although not specifically shown, the accumulator register 54 is, in fact, two, separate, 8-bit registers so that for byte instructions only the lower eight bits of the accumulator register 54 are written into; for word instructions, all 16-bits are written into.

A 16-bit data latch 56 is also provided to hold data conducted from other parts of the processor 10 or data that is supplied to the processor device 10 from an external source. In this latter case, the data is received at the data terminals $Y_0$–$Y_{15}$. The data latch 56 is transparent when the signal applied to the DLE input terminal of the latch is HIGH; and data is latched on the LOW to HIGH transition of the clock signal applied to the CP input terminal when the DLE input is LOW.

Three sets of output lines 52a, 54a and 56a, one set each from the RAM latch 52, accumulator 54, and data latch 56, respectively, are coupled to a multiplexing arrangement consisting of three individual 3-to-1 multiplexers: an R-multiplexer (R-MUX) 58 an S-multiplexer (S-MUX) 59, and a U-multiplexer (U-MUX) 60. In response to the control signals supplied via the control bus 47, the R-MUX 56 selects one set of the output lines 52a, 54a or 56a to be connected via an OVS/R/ BUS 58a to the R operand input of arithmetic-logic unit (ALU) 62. The U-MUX 60 also selects one of the three sets of output signal lines 52a, 54a and 56a and applies the selected set as an operand to a barrel shifter 64 whose (16-bit) output lines are connected to the U operand input of the ALU 62. The S-MUX 59 selects from the output line set 52a or 54a, or the I BUS 42; the operand selected by the S-MUX 59 is conducted to the S operand input of the ALU 62 via the OVS/S/ -BUS 59a. The ALU 62 is provided with full carry look-ahead logic across all 16-bits in the arithmetic mode. In addition, the ALU is capable of operating on either one, two or three operands, depending upon the instruction being executed, the results of any operation being provided on output lines 63. The ALU 62 has the ability to execute all conventional one and two operand operations such as pass, complement, twos complement, add, substract, AND, NAND, OR, NOR, EXCLUSIVE-OR, and EXCLUSIVE-NOR. Further, the ALU can also execute three operand instructions, such as rotate-and-merge and rotate-and-compare-with-mask. In this latter case, a 16-bit barrel shifter 64 is used to permit rotating an operand supplied by either the RAM 48, the accumulator 54 or the data latch 56 up to 15 positions. In the word mode, the barrel shifter 64 rotates a 16-bit word; in the byte mode it rotates only the lower 8-bits.

The ALU 62 produces three status signals: carry (C), negative (N), and overflow (OVR), respectively indicating whether the current arithmetic operation produced a carry, a negative result or an overflow condition. The appropriate status signal C, N or OVR is generated at the byte or word level, depending upon whether the processor device is operating in the byte or word mode. In addition, a zero status signal (Z) is generated by the zero detect circuit 66, which detects zero at both the byte and word level.

The status signals C, N, OVR and Z are conducted from the ALU 62 and the zero detect circuit 66 via a 4-bit status bus 68 to a multiplexer (MUX) 70 which, in turn, and in response to appropriate signals received on the control bus 47, communicates these status signals to the input sections of the lower order four stages of an 8-bit status register 72. The upper four stages of the status register 72 are used to store a link bit (QLINK) used in cyclic redundancy checking (CRC) and single-bit shifting operations, and three user definable flags. FIG. 12 illustrates the assignments of each of the eight stages of the status register 72, each stage having the output signal line indicated (i.e., 73a, 73b, . . . 73h), forming an 8 bit-bus 73 that conducts the status register 72 outputs to other parts of the processor 10.

The status register 72 can be loaded from the data latch 56 (via a data path that would include one of the multiplexers 58, 60, the ALU 62, the FMUX 80 and the internal data bus 82). When the status register 72 is loaded in the word mode, all 8 bits are updated; in the byte mode, only the lower 4 bits (Z, C, N, OVR) are updated.

The status register 72 can also, via the FMUX 80, be selected as a source for the internal data bus 82. When the status register 72 is selected as a source in the word mode, all 8 bits are loaded into the lower byte of the selected designation (i.e., the RAM 48, the accumulator 54, or the data latch 56); the upper byte of the selected destination is loaded with all ZEROs). In the byte mode, the status register 72 again loads into the lower byte of the destination, but the upper byte remains unchanged. This store and load combination allows saving and restoring the status register for interrupt and subroutine processing.

The ALU 62 includes at a carry input (CI) to receive signals provided by a carry multiplexer (MUX) 74. The MUX 74 can select an input of $\phi$, 1 or the stored carry bit conducted from the status register 72 by signal line 73g. Using the stored carry bit as the carry input allows execution of multiprecision addition and substraction.

The ALU 62 communicates certain of the operands received from the R-MUX 58, S-MUX 59 or barrel shifter 60 via (16) signal lines 76 to a priority encoder 78 which, in turn, produces a 5-bit binary encoded word to indicate the location of the highest order ONE in the 16-bit word received at its input. The information supplied to the priority encoder 78 is generated by the ALU 62, which is also capable of performing an AND operation on the operand to be prioritized and a predetermined mask. The mask determines which bit locations to eliminate from prioritization.

The ALU output lines 63 are applied to a F multiplexer (F-MUX) 80. The F-MUX 80 also receives the eight outputs (QZ, QC, . . . , etc.) of the status register 72, which form a status bus 73, and the five output lines 79 from the priority encoder 78. The F-MUX 80 selects between these three sets of output signal lines (63, 73 and 79), guided by the control signals received on the control bus 47, and conducts the selected set to the internal 16-bit data bus 82. Data bus 82 in turn communicates the selected signals to the RAM 48 or accumulator register 54, where, according to the instruction being executed, the selected data from the F-MUX may be stored.

The internal data bus 82 is also connected to an output buffer 84. The output buffer 84 is controlled by signals received at the OVS/OE/$_y$ input of the processor 10. When a LOW is applied to OVS/OE/$_y$ input, the signals appearing on the internal data bus 82 will also appear on (i.e., be transferred to) the data terminals $Y_0$–$Y_{15}$ and can then be stored in the data latch 56 or transferred (via the bi-directional Y-BUS, see FIG. 1) to an outside destination.

In addition the low-order 8-bits on the internal data bus 82 are communicated to the status register 72 which, in turn, can also be selected as a source of data to be communicated on the internal data bus 82 by the F-MUX 80. When the status register 72 is selected as a source in the word mode, all 8-bits are loaded into the lower byte of the destination (i.e., the RAM 48, or accumulator 64); the upper byte of the destination is loaded with all ZEROS. In the byte mode, the status register 72 again loads into the lower byte of the destination, but the upper byte of the destination remains unchanged. This store and load combination allows saving and restoring the contents of the status register 72 for interrupt and subroutine processing.

The signal lines 73 that communicate the 8-bits of output information from the status register 72 to the F-MUX 80 also communicate that information to a test logic circuit (TLC) 88 which contains the logic circuitry necessary to develop twelve condition code test signals. The condition code test signals developed by the TLC 88 are applied to a multiplexer (MUX) 90 which can select one of these test signals and place it on the CT processor output terminal for use, for example, by the microprogram memory sequencer 12 (FIG. 1).

The MUX 90 may be addressed in two different ways. One way is through a test instruction which specifies the test condition to be placed on the CT output terminal, but does not allow an ALU 62 operation at the same time. Four bits of the 16-bit test instruction word (described more fully below) are conducted from the instruction latch 44 by four signal lines 92 to a multiplexer (MUX) 94 to select and pass the bus 92 to address the MUX 90.

The second method used to address the MUX 90 uses a bi-directional T-BUS 96 as an input. As will be seen, this requires extra microcode, but provides the ability to simultaneously test and execute.

A set of tri-state output buffers 98 control the bi-directional 4-bit T-BUS 96 and conducts thereto the four signal lines 68 which carry the C, N, OVR status signals from the ALU 62 and the Z status from the zero detect circuit 66. The signals conducted by the signal lines 68 are applied to the T-BUS 96 when the set of output buffers 98 are enabled by placing HIGH on the $OE_T$ input terminal. This allows the four internal ALU 62 status bits (Z, C, N, OVR) to be stored at some external destination. A LOW signal on the $OE_T$ input terminal forces the output buffers 98 into the HIGH impedance state. External devices can then drive the T-BUS 96 to select a test condition for the CT output.

C. Instruction Set

The processor 10 of the present invention operates in response to an instruction set of 16-bit instruction words. The instruction set is divided into eleven types. These eleven types are:

1. Single Operand;
2. Two Operand;
3. Shift;
4. Bit;
5. Prioritize;
6. Rotate by N;
7. Rotate and Merge;
8. Rotate and Compare;
9. CRC;
10. NO-OP; and
11. Status.

The following paragraphs describe each of these instruction types in detail. Included with each discussion is a table that specifies the bit designations indicative of the particular instruction.

Single-operand instructions—Single-operand instructions contain four indicators: the operation, source (location) of the operand, destination of the results, and whether execution is in the byte or word mode. Table I shows the instruction format and bit assignments.

TABLE I

| Single Operand Instruction |||||||||||||||||
|---|---|---|---|---|---|---|---|---|---|---|---|---|---|---|---|---|
| A. RAM |||||||||||||||||
| 15 | 14 | 13 | 12 | 11 | 10 | 9 | 8 | 7 | 6 | 5 | 4 | 3 | 2 | 1 | 0 ||
| B/W | ∧∧∧ ∨∨∨ ∧∧∧ ||| Operation || Operand Location | (A) || Dest. || RAM Address ||||
| (0)=B | | (2) | | (12) A→Dest. || (0) | RAM || ACC ||| (0)→(31) ||||
| (1)=W | | | | (13) Ā→Dest. || (2) | RAM || NONE |||||||
| | | | | (14) A plus || (3) | RAM || STATUS |||||||
| | | | | 1→Dest. || (4) | ACC || RAM |||||||
| | | | | (15) A plus || (6) | D || RAM |||||||
| | | | | 1→Dest. || (7) | 1 || RAM |||||||
| | | | | || (8) | 0 || RAM |||||||
| | | | | || (9) | D(0E) || RAM |||||||
| | | | | || (10) | D(SE) || RAM |||||||

TABLE I-continued

Single Operand Instruction

B. NON-RAM

| 15 | 14 13 | 12 11 10 9 | 8 7 | 6 5 | 4 3 2 1 0 |
|---|---|---|---|---|---|
| B/W | (3) | Operation | Operand Location | (A) | Destination |
| (0)=B | | (12) A→Dest. | (4) | ACC | (0) NONE |
| (1)=W | | (13) Ā→Dest. | (6) | D | (1) ACC |
| | | (14) A plus 1→Dest. | (7) | I | (4) STATUS |
| | | | (8) | 0 | (5) ACC, STATUS |
| | | (15) Ā plus 1→Dest. | (9) | D(0E) | |
| | | | (10) | D(SE) | |

The single-operand instruction (like many of the other instructions) may be divided into two subgroups: (a) those instructions that utilize RAM 48 as either an operand source (A) or as the destination (Dest.) of the results, or both (Section A of Table I); and (b) those instructions that do not use the RAM 48 (Section B of Table I).

Referring first to the single-operand instructions that use the RAM 48 (Table IA), bits 0–4 designate the address of the RAM 48 which contains the operand, or at which the results will be stored, or both, when applicable. As indicated in the Table IA, these bits can collectively take on the binary vaules of zero (0) to thirty-one (31). Bits 5–8 of the instruction word specify the operand location (A) and the destination (Dest.) of the results. The parenthetical quantities indicate (in decimal) the binary values bits 5–8 assume to specify the operand location (A)/destination combination to the right of the parenthesis. For example, if bits 5–8 take on a value of ZERO (0), the operand (A) is obtained from RAM 48 at an address specified by the bits 0–4 of the instruction. The results of the operation will be stored in the accumulator register. Similarly, if the bits 5–8 of the instruction word take on the value of four (4) the operand will be obtained from the accumulator 64 and the results of the operation will be stored in the RAM 48 at the address specified by bits 0–4 of the instruction word.

A value of three (3) in bits 5–8 of the single-operand instruction will specify that an operand is to be taken from the RAM 48 at an address determined by the bits $\phi$–4 of the instruction, and operated on with the result stored in the status register 72.

A value of seven (7) in bits 5–8 of the single-operand, RAM instruction word (Table IA) specify an immediate instruction (I). As mentioned, immediate instructions require two clock cycles for execution. Thus, during the second clock cycle, the operand is obtained from the data on the I BUS for the function specified in the first clock cycle.

An operand/destination designation of (9) or (10) in bits 5–8 of the single operand instruction using RAM indicates that the operand is obtained from the lower 8 bits ($\phi$–7) of the data latch 56. The designation D ($\phi$E) refers to ZERO extend, to wit: the high order 8-bits of the operand are forced to all ZEROs. The designation D(SE) indicates a sign extend operation: the high order 8-bits of the operand are forced to the same state or value as bit 7 of the operand.

The operations performed in response to a single operand instruction are pass, complement, increment, and twos complement. Bits 9–12 of the instruction word specify the required operation. Thus, for example, a combined bit value of (12) in bit locations 9–12 specifies that the designated operand is merely passed through the ALU 62 to the designated destination. An operation designated by a (13) is the complement operation; and the operations designated by (14) and (15), respectively, specify the increment and two's complement operations.

Bits 13 and 14 of the instruction word are used as an additional designator for ease in decoding this instruction.

Finally, bit 15 denotes whether the operation is to be in a word (16-bits) mode or a byte (8-bits) mode. If operating in the word mode (i.e., bit 15 set to a HIGH), all 16-bits of the operand will be operated on. If, however, bit 15 of the instruction word is LOW, only the lower order 8-bits of the designated operand (A) are operated on and the result loaded into the lower eight bits of the destination; if the destination is the status register 72, only the lower four bits of the result will be loaded into the four lower stages (Z, C, N, OVR) of the status register 72.

The non-RAM group of single operand instructions (Table IB) are basically the same as those that utilize the RAM. The non-RAM group, however, does not use RAM 48 as either a source or a designation. Accordingly, the operand source location (A) is designated by instruction bits 5–8 and the destination is designated by instruction bits $\phi$–4 as indicated.

Two-operand instructions—Two-operand instructions contain five indicators: the operation, the location of an A operand, location of a B operand, the destination of the results (Dest.), and whether operation is in the byte or word mode (B/W). The two operand instructions are divided into three sub-groups: those which utilize the RAM 48 as one of the operand locations A or B and may utilize the RAM 48 as a destination (Table IIA, below), those that use the RAM 48 as a destination (Table IIB, below), and those that do not utilize the RAM 48 at all (Table IIC, below).

TABLE II

Two Operand Instruction

A. RAM As Operand Location (A/B)

| 15 | 14 | 13 | 12 | 11 | 10 | 9 | 8 | 7 | 6 | 5 | 4 3 2 1 0 |

TABLE II-continued
Two Operand Instruction

| B/W | | A | B | Dest. | Operation | RAM Address |
|---|---|---|---|---|---|---|
| (0)=B | (∅) | (0) RAM | ACC | ACC | (0) B minus A | (0)→(31) |
| (1)=W | | (2) RAM | I | ACC | (1) B minus A with carry | |
| | | (3) D | RAM | ACC | (2) A minus B | |
| | | (8) RAM | ACC | NONE | (3) A minus B with carry | |
| | | (10) RAM | I | NONE | (4) A plus B | |
| | | (11) D | RAM | NONE | (5) A plus B with carry | |
| | | (12) RAM | ACC | RAM | (6) $\overline{A \cdot B}$ | |
| | | (14) RAM | I | RAM | (7) A · B | |
| | | (15) D | RAM | RAM | (8) $\overline{A \oplus B}$ | |
| | | | | | (9) A + B | |
| | | | | | (10) $\overline{A + B}$ | |
| | | | | | (11) A · $\overline{B}$ | |

B. RAM As Destination Only
15  14  13  12  11  10  9  8  7  6  5  4 3 2 1 ∅

| B/W | | A | B | Operation | RAM Address/Dest. |
|---|---|---|---|---|---|
| (0)=B | (2) | (1) D | ACC | (0) B minus A | 0 → 31 |
| (1)=W | | (2) ACC | I | (1) B minus A with carry | |
| | | (5) D | I | (2) A minus B | |
| | | | | (3) A minus B with carry | |
| | | | | (4) A plus B | |
| | | | | (5) A plus B with carry | |
| | | | | (6) $\overline{A \cdot B}$ | |
| | | | | (7) A · B | |
| | | | | (8) $\overline{A \oplus B}$ | |
| | | | | (9) A + B | |
| | | | | (10) $\overline{A + B}$ | |
| | | | | (11) A · $\overline{B}$ | |

C. NON-RAM
15  14  13  12  11  10  9  8  7  6  5  4 3 2 1 ∅

| B/W | | A | B | Operation | Destination |
|---|---|---|---|---|---|
| (0)=B | (3) | (1) D | ACC | (0) B minus A | (0) NONE |
| (1)=W | | (2) ACC | I | (1) B minus A with carry | (1) ACC |
| | | (5) D | I | (2) A minus B | (4) STATUS |
| | | | | (3) A minus B with carry | (5) ACC, STATUS |
| | | | | (4) A plus B | |
| | | | | (5) A plus B with carry | |
| | | | | (6) $\overline{A \cdot B}$ | |
| | | | | (7) A · B | |
| | | | | (8) $\overline{A \oplus B}$ | |
| | | | | (9) A + B | |
| | | | | (10) $\overline{A + B}$ | |
| | | | | (11) A · $\overline{B}$ | |

Instruction bits 5-8 of the two-operand instructions specify the operation to be performed. There are twelve possible operations, designated by bit values, in decimal of (φ) through (11): B minus A, B minus A with CARRY, A minus B, A minus B with CARRY, A plus B, A plus B with CARRY, A ANDed with B, (A ANDed with B) complemented, A exclusive ORed with B, (A ORed with B) complemented, A ORed with B, and A exclusive ORed with B complemented. Here, as before, A and B are used to identify the source or location of the operand.

Instruction bits 9-12 specify the location of the first operand (A), the location of the second operand (B), and the destination (DEST) of the results of the operation. For the two operand instructions that utilize the RAM 48 either as the location of one operand or a destination (or both), the instruction bits φ-4 specify the RAM address involved (Table IIA); two-operand instructions that designate the RAM 48 as the destination of the results only specify the RAM address by the bits φ–4 of the instruction word (Table IIB).

Bits 13 and 14 differentiate the two operand instruction words, with a value of ZERO (φ) identifying the instruction as one using RAM 48 as the source of an operand a value of two (2) identifies the instruction as one using RAM 48 as a destination, and a value of three (3) identifies the instruction as involving a non-RAM operation. Bit 15 of the instruction word, as before, designates whether the operation is to be in byte or word mode.

Shift Instructions—Table III, below, sets forth the instructions used to perform single-bit shift operations in the data processor 10. Four indicators are used: direction and shift linkage, source, destination, and byte vs. word mode.

one bit shift up. The MSB (which may be bit 7 or 15, depending upon whether operation is in the byte or word mode, respectively) of the source becomes the QLINK that is loaded in the proper stage of the status register 72. The LSB of the shifted operand is provided (via a data path indicated as 62A) with either a φ, 1, or the QL output of the status register 72 (i.e., the QLINK). Actual circuit configuration, which will be shown below, utilizes the R-MUX 58 circuitry for insertion of the designated input. As will be seen, the bit to become the LSB of the shifted operand is inserted by the ALU 62 (FIG. 2; see also FIGS. 14C and 15).

On a shift down instruction, diagrammatically illustrated in FIG. 3B, the MSB of the shifted operand (i.e., bit 7 or 15, depending upon byte/word mode) may be loaded with ZERO, ONE, the contents of the stage of

TABLE III

| Shift Instruction | | | | | |
|---|---|---|---|---|---|
| A. RAM | | | | | |
| 15 14 13 12 11 10 9 | 8 7 | 6 | 5 | 4 3 2 1 φ | |
| B/W | Source | Direction | Input | RAM Address/Dest. | |
| (0)=B (2) | (6) RAM | (0) Up | φ | (φ)→(31) | |
| (1)=W | (7) D | (1) Up | 1 | | |
| | | (2) Up | QLINK | | |
| | | (4) Down | φ | | |
| | | (5) Down | 1 | | |
| | | (6) Down | QLINK | | |
| | | (7) Down | QC | | |
| | | (8) Down | QN⊕QOVR | | |
| B. NON-RAM | | | | | |
| 15 14 13 12 11 10 9 | 8 7 | 6 | 5 | 4 3 2 1 φ | |
| B/W | Source | Direction | Input | Dest. | |
| (0)=B (3) | (6) ACC | (0) Up | φ | (φ) NONE | |
| (1)=W | (7) D | (1) Up | 1 | (1) ACC | |
| | | (2) Up | QLINK | | |
| | | (4) Down | φ | | |
| | | (5) Down | 1 | | |
| | | (6) Down | QLINK | | |
| | | (7) Down | QC | | |
| | | (8) Down | QN⊕QOVR | | |

Shift instructions are also sub-divided into two groups: Those that utilize the RAM 48 as a source or destination (Table IIIA) and those that do not (Table IIIB). When RAM 48 is used, instruction bits φ–4 specify the RAM address. Instruction bits 5–8 of the shift instruction word specify the direction of the shift (up or down) as well as what will be shifted into the vacated bit position (input). For example, on a shift up instruction, the LSB of the shifted operand may be loaded with ZERO, ONE, or a link-status bit (QLINK). The MSB of the shifted operand is loaded into the link-status bit position of the status register 72 (see below).

The single-bit shift operations are diagrammatically illustrated in FIGS. 3A and 3B. FIG. 3A illustrates the shift-up operation and shows the operand source (designated by instruction bits 9–12) being applied to the barrel shifter 64. Command signals supplied by the control bus 47 (FIG. 2) cause barrel shifter 64 to effect a the status register 72 containing the stored C bit (QC), the exclusive-OR of the N status bit and the OVR status bit (QN⊕QOVR) from the status register 72, or the QL output of the status register 72 (i.e., the link status bit, QLINK). As will be seen, the input bit is supplied by the R-MUX 58. The LSB that is shifted from the shifted operand is loaded into the link status bit position of the status register 72.

Bit Instructions—The bit instructions, illustrated in Table IV (below), are used to set, reset or test individual bits of a byte or word. The bit instructions contain four indicators: the operation, the source/destination of the word to be operated on, the address of the bit to be operated on, and whether operation is in the byte or word mode. As with previous instructions, the bit oriented instructions are divided into two groups: those that utilize RAM 48 (Table IVA) and those that do not (Table IVB).

TABLE IV

| Bit Instruction | | | | | | | | | |
|---|---|---|---|---|---|---|---|---|---|
| A. RAM | | | | | | | | | |
| 15 | 14 | 13 | 12 | 11 10 9 | 8 | 7 | 6 | 5 | 4 3 2 1 φ |

TABLE IV-continued

Bit Instruction

| B/W | 〰 N | Operation | RAM Address |
|---|---|---|---|
| (0)=B (1)=W | (3) (∅) → (15) | (13) Set RAM, bit N<br>14 Reset RAM, bit N<br>15 Test RAM, bit N | (∅)→(31) |
| (0)=B | (2) (∅) → (15) | (12) $2^N$ → RAM | (∅)→(31) |
| (1)=W | | (13) $\overline{2^N}$ → RAM<br>(14) RAM plus $2^N$ → RAM<br>(15) RAM minus $2^N$ → RAM | |

B. NON-RAM

| 15 | 14 13 12 11 10 9 | 8 7 6 5 | 4 3 2 1 ∅ |
|---|---|---|---|
| B/W | 〰 N | 〰 | Operation |
| (0)=B (1)=W | (3) (0) → (15) | (12) | (∅) TEST ACC, bit N<br>(1) Reset ACC, bit N<br>(2) Set ACC, bit N<br>(4) ACC plus $2^N$ → ACC<br>(5) ACC minus $2^N$ → ACC<br>(6) $2^N$ → ACC<br>(7) $\overline{2^N}$ → ACC<br>(16) Test D, bit N<br>(17) Reset D, bit N<br>(18) Set D, bit N<br>(2∅) D plus $2^N$ → NONE<br>(21) D minus $2^N$ → NONE<br>(22) $2^N$ → NONE<br>(23) $\overline{2^N}$ → NONE |

As the Table IVA indicates, the bit instructions that utilize RAM use instruction bits 0-4 to designate the RAM address. The RAM 48 is always the destination of the word or byte operated on by the bit instructions of Table IVA. The particular bit position to be operated on is specified by the instruction bits 9-12. Instruction bits 5-8, designate the operation. As indicated in the table, the operations which can be performed are: set bit N which forces the $N^{th}$ bit of the designated byte or word to a ONE; reset bit N, which forces the $N^{th}$ bit to a ZERO; test bit N, which sets the ZERO status bit (i.e., the Z stage of status register 72) if bit N of the tested byte or word is a ZERO; load $2^N$, which loads a ONE in bit position N and ZERO in all other bit positions; load $\overline{2^N}$, which loads ZERO in bit position N and ONE in all other bit positions; increment by $2^N$, which adds 2 $^N$ to the operand; and decrement by $2^N$, which subtracts $2^N$ from the operand.

Table IVB illustrates those bit instructions that do not use the RAM 48. The operand, destination and operation are specified by the instruction bits ϕ-5. The bit position to be operated on is specified by the instruction bits 9-12. The operations performed, indicated in the Table IVB, are the same as those described with regard to use of the RAM 48 (i.e., Table IVA).

Prioritize Instruction—The prioritize instructions, illustrated in Table V, below, contain four indicators: the location of the operand to be prioritized, the location of the mask operand, the destination of the results, and whether operation is in the byte or word mode.

TABLE V

Prioritize Instruction

A. RAM

| 15 | 14 13 12 11 10 9 | 8 7 6 | 5 4 3 2 1 ∅ |
|---|---|---|---|
| B/W | 〰 | Destination | Operand Location | RAM Address/Mask |

| B/W | | Destination | Operand Location | RAM Address/Mask |
|---|---|---|---|---|
| (0)=B (1)=W | (2) | (8) ACC<br>(10) NONE<br>(11) RAM | (7) ACC<br>(9) D | (0)→(31) |

| B/W | 〰 | Mask Location | Destination | RAM Address/Operand |
|---|---|---|---|---|
| (0)=B (1)=W | (2) | (8) ACC<br>(10) NONE<br>(11) I | (0) ACC<br>(2) NONE | (0)→(31) |

TABLE V-continued

Prioritize Instruction

| B/W | Mask | Mask Location | Operand Location | RAM Address/Dest. |
|---|---|---|---|---|
| (0)=B | (2) | (8) ACC | (3) RAM | (0)→(31) |
| (1)=W | | (10) NONE | (4) ACC | |
| | | (11) I | (6) D | |

B. NON-RAM

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| B/W | Mask | | | Mask Location | | | Operation | | | | Destination | | | | |
| (0)=B | (3) | | | (8) ACC | | | (4) ACC | | | | (0) NONE | | | | |
| (1)=W | | | | (10) NONE | | | (6) D | | | | (1) ACC | | | | |
| | | | | (11) I | | | | | | | | | | | |

The function of the prioritize instructions is diagrammatically illustrated in FIG. 4, which shows the operand being provided by the OVS/R/ BUS 58a to the R operand input of the ALU 62 with the complement of the mask operand. As will be seen, the signals communicated from the instruction decode circuit 46 to the ALU 62, via the control bus 47, in effect, configure the ALU 62 as the symbolically represented AND circuit 62B of FIG. 4, logically ANDing the operand and the complement of the mask, on a bit-by-bit basis. The mask operand is selected by the S-MUX 59 which also effects the complementing function, as symbolically represented by the inverter 59b.

What FIG. 4 illustrates, in diagrammatic form, is that designation of ZERO in any bit position of the mask used by the prioritize instructions allows the corresponding bit in the operand to participate in the priority encoding function. Conversely, a ONE in the mask forces the corresponding bit in the operand to a ZERO eliminating it from participation in the priority encoding function.

The priority encoder 78 accepts the 16-bit input and produces a 5 bit binary weighted code indicating the bit position of the highest priority active bit. For example, if none of the inputs of the priority encoder 78 are active (i.e., HIGH), the output is ZERO. In the word mode, if the MSB is HIGH, the output is a binary ONE value, etc. FIG. 5 lists the output as a function of the highest-priority active-bit position in both the word and byte mode.

Rotate By N Instructions—The rotate by N instructions are illustrated in Table VI, below. This instruction contains four indicators: the source of the multi-bit word to be rotated, the destination at which the rotated word is to be stored, the number of places (N) that the word is to be rotated, and whether operation is in the byte or word mode.

TABLE VI

Rotate by N Instruction

A. RAM

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| B/W | Mask | | | N | | | | Source | | Dest | | RAM Address | | | |
| (0)=B | (0) | | | (0)→(15) | | | | (12) RAM | | ACC | | (0)→(31) | | | |
| (1)=W | | | | | | | | (14) RAM | | NONE | | | | | |
| | | | | | | | | (15) RAM | | RAM | | | | | |

| B/W | Mask | N | Source | RAM Address/Destination |
|---|---|---|---|---|
| (0)=B | (1) | (0)→(15) | (0) ACC | (0)→(31) |
| (1)=W | | | (1) D | |

B. NON-RAM

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| B/W | Mask | | | N | | | | | | | | | Source | Dest. | |
| (0)=B | (3) | | | (0)→(15) | | | | (12) | | | | (24) D | | NONE | |
| (1)=W | | | | | | | | | | | | (25) D | | ACC | |
| | | | | | | | | | | | | (28) ACC | | NONE | |
| | | | | | | | | | | | | (29) ACC | | ACC | |

The rotate by N operation performs a circular shift on the designated operand, using the barrel shifter 64 (FIG. 2). The term "circular shift", as used herein, is intended to mean an N-bit shift operation in which the bit shifted out of one end of the shifted operand is shifted into the other end. An example of this instruction is shown in FIG. 6. The source supplies the operand to the barrel shifter 64 to be rotated a designated number (i.e., N, where N=4 in the example), and the destination receives the rotated operand. Example 6 also illustrates a rotate by N operation for the word mode and the byte mode.

When the RAM 48 is used to supply the operand to be rotated, the location at which the rotated operand will be stored, or both, instruction bits φ-4 specify the address for the RAM 48. Instruction bits 5-8 specify the source and destination (Dest.) when the operand to be rotated is obtained from the RAM 48; and merely the source when the operand to be rotated is obtained from the accumulator (ACC) 54 or the data latch (D) 56 and the result stored in the RAM 48. For rotate-by-N instructions not utilizing the RAM, the instruction bits 5-8 are set to a value of (12) and instruction bits φ-4 specify the source and destination (Table VIB).

Bits 9-12 of the rotate-by-N instruction contain the N indicator which specifies the number of bit positions the source operand is to be rotated up (0 to 15). In the word mode, all sixteen bits are rotated up while in the byte mode, only the lower eight bits (0 to 7) are rotated up, as illustrated in FIG. 6.

Rotate and Merge Instruction—The rotate-and-merge instructions contain five indicators: the rotated operand source (Rot. Op. Source), the non-rotated operand source/destination (Non Rot. Op./Dest.), mask, the number of bit positions (N) the selected operand is to be rotated, and whether or not operation is in the byte or word mode (B/W). Table VII sets forth the bit designations of the rotate and merge instruction.

bit-by-bit basis) two sets of AND gate circuits 621C and 622C whose outputs are coupled to an OR gate 623C. The output of the OR gate 623C is coupled, via the F-MUX 80' to the data bus 82' which is coupled back to the source of the non-rotated operand. The rotated operand is received by the barrel shifter 64 and is rotated by the barrel shifter N places, as dictated by the signals received on the control bus 47. The mask input (supplied by the S-MUX 59) selects, on a bit by bit basis, the rotated operand or the non-rotated operand, via the AND gate circuits 621C and 622C, respectively (the mask being complemented by the inverter circuits 624C before being applied to the AND circuit 622C). A ONE on bit i of the mask will select the $i^{th}$ bit of the rotated operand as the $i^{th}$ output bit, while a ZERO in bit i will select the $i^{th}$ of the non-rotated operand as the output bit. The output word is returned to the non-rotated operand location. An example of this instruction is given in FIG. 8.

Rotate-and Compare-Instructions—Shown in Table VIII, below, is the rotate-and compare-instruction, which contains five indicators: the source of the operand to be rotated, the source of the non-rotated operand, and the mask source (all specified by instruction bits 5-8); the number of bit positions (N) the rotated operand is to be rotated; and whether or not the instruction is to be performed in the byte or word mode. Instruction bits φ-4 specify the address of RAM 48, if the

TABLE VII

| Rotate-and-Merge-Instruction | | | | | | | | | |
|---|---|---|---|---|---|---|---|---|---|
| 15 | 14 13 12 | 11 10 9 | 8 | 7 | 6 | 5 | 4 3 2 1 0 |
| B/W | ∧∧∧ | N | Rot. Op. Source | Non Rot. Op. Source/Dest. | Mask Source | RAM Address |
| (0)=B (1)=W | (1) | (0) → (15) | (7) D (8) D (9) D (10) D (12) ACC (14) RAM | ACC ACC RAM RAM RAM ACC | I RAM I ACC I I | (0)→(31) |

Instruction bits φ-4 designate the RAM address, when the RAM 48 is utilized. Instruction bits 5-8 specify the rotated operand source, the non-rotated operand/destination, and the mask. Instruction bits 9-12 specify the N indicator. Instruction bits 13 and 14 are set to a value of ONE, and bit 15 specifies the byte or word mode.

The function performed by the rotate-and-merge instruction is symbolically illustrated in FIG. 7, which shows ALU 62 configured as ALU 62C, forming (on a RAM is to be utilized as the source of one of the operands.

TABLE VIII

| Rotate-and-Compare Instruction | | | | | | | |
|---|---|---|---|---|---|---|---|
| 15 | 14 13 | 12 11 10 9 | 8 | 7 | 6 | 5 | 4 3 2 1 0 |
| B/W | ∧∧∧ | N | Rot. Op. | Non Rot. Op./Dest. | Mask | RAM Address |
| 0=B 1=W | (1) | 0 → 15 | (2) D (3) D (4) D (5) RAM | ACC RAM RAM ACC | I I ACC I | (0)→(31) |

The function performed by the rotate-and-compare instruction is symbolically illustrated in FIG. 9, in which the ALU 62 is logically configured (by the control signals on control bus 47) as the ALU 62D, comprising an inverter 621D and two sets of AND gate circuits 622D and 623D gates 62b and 62c, the outputs of which are applied to a comparator 624D. The operand to be rotated is applied to and rotated by the barrel shifter 64 N places, as specified by the control signals supplied to the barrel shifter via the control bus 47. The mask is inverted by the inverter 621D and ANDed on a bit-by-bit basis with both the output of the barrel shifter 64 and the non-rotated operand in the other AND gate. Thus, a ONE in the mask input in one AND gate eliminates that bit from comparison. A ZERO allows the comparison. If the comparison passes (i.e., both the rotated and the non-rotated operands are the same), the ZERO flag of the status register is set. If it fails (i.e., both operands—the rotated and the non-rotated—are not identical), the ZERO flag is reset. An example of this instruction is given in FIG. 10.

CRC Instructions—The CRC (cyclic redundancy check) instructions provide a method for generation of the check bits in a CRC calculation. FIGS. 11A, B diagrammatically illustrate the method used to generate these check bits and Table IX, below, illustrates the instruction format.

TABLE IX

| CRC Instruction | | | | |
|---|---|---|---|---|
| 15 14 13 | 12 11 10 9 8 7 | 6 5 | 4 3 2 1 0 | |
| B/W  〰〰 | Operation | Direction | RAM Address | |
| (1) (2) | (6) | (3) Forward (9) Reverse | (0) → (31) | |

As illustrated in FIGS. 11A, B, this time the (FIG. 2) is logically configured by the control signals conducted on the control bus 47 as an ALU 62E a plurality (16) of two input AND gates 621E, the outputs of which are each coupled to one input of a corresponding one of exclusive OR gates 622E. Each stage of the accumulator register 54 is coupled to an input of one of the representative AND gates 621E. Each stage of a specified 16-bit location of the RAM 48 is accessed and the contents coupled to the barrel shifter 64 (via the 16-bit latch 52 and U-MUX 60-not shown in FIGS. 11A, B). The accumulator register 54 serves as a polynomial mask to define the generating polynomial while the designated location of the RAM 48 holds the partial result and eventually the calculated check sum. The link-bit (QLINK, i.e., the QL output of the status register 72) is used as the serial input which combines with the MSB (i.e., bit-15) of the check sum register (RAM 48), according to the polynomial defined by the polynomial mask register (accumulator 64). When the last input bit has been processed, the check sum register (RAM 48) contains the CRC check bits.

Two CRC instructions are provided: CRC forward and CRC reverse. The CRC forward instruction is illustrated in FIG. 11A by the input line 100 to the exclusive-OR gate 623E being tied to the MSB (bit 15) of the RAM 48, and the ZERO applied to the input line 101 of the low order one of the exclusive-OR gates 622E. The CRC reverse instruction is illustrated by the FIG. 11B indicating that the input line 100 of the exclusive-OR gate 623E is coupled to the LSB (bit 0) of the RAM 48 and the LSB output of the barrel shifter 64 is coupled to the input line 101 of the low order one of the exclusive-OR gates 622E. The difference in these two instructions arises because the CRC standards do not specify which data bit is to be transmitted first, the LSB or the MSB, but they do specify which check bit must be transmitted first: the MSB in the case of CRC forward functions and the LSB in the case of CRC reverse functions. A CRC forward operation sets the barrel shifter to shift up by one bit; whereas, for CRC reverse instructions, the barrel shifter is set to shift up 15 positions.

No-Op Instruction—The No-Op instruction, set forth below in Table X, does not change any internal registers in the processor unit 10. This instruction merely provides a one instruction cycle delay and preserves the status register 72, the RAM 48 and the accumulator 64.

TABLE X

| NO-OP Instruction | | | | |
|---|---|---|---|---|
| 15 14 13 12 | 11 10 9 8 7 6 5 | 4 3 2 1 0 | | |
| (0) (3) | (8) (10) | (0) | | |

Status Instructions—Illustrated in Table XI, below, are the instructions used to operate on the individual bit location of the status register 72.

TABLE XI

| Status Instruction | | | | | |
|---|---|---|---|---|---|
| A. SET/RESET | | | | | |
| 15 14 13 | 12 11 10 9 | 8 7 6 5 | 4 3 2 1 0 | | |
| 〰〰 〰〰 | Operation | 〰〰〰 | Bit(s) Affected | | |
| (0) (3) | (11) SET STATUS | (10) | (3) Z, C, N, OVR (5) LINK (6) FLAG1 (9) FLAG2 (10) FLAG3 | | |
| B/W 〰〰 | Operation | 〰〰〰 | Bit(s) Affected | | |
| (0) (3) | (10) RESET STATUS | (10) | (3) Z, C, N, OVR (5) LINK (6) FLAG1 (9) FLAG2 (10) FLAG3 | | |
| B. STORE STATUS | | | | | |
| 15 14 13 12 | 11 10 9 8 7 6 5 | 4 3 2 1 0 | | | |

TABLE XI-continued

| Status Instruction | | | | |
|---|---|---|---|---|
| | | | | Destination |
| 0=B 1=W | (2) RAM | (7) | (10) | (0)→(31) RAM ADDRESS |
| 0=B 1=W | (3) NON-RAM | (7) | (10) | (0) NONE (1) ACC |

C. TEST STATUS

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | | | | | | | | | | Test Conditions (CT) |
| 0 | | (3) | | (9) | | | | . | | (10) | (0)(N ⊕ OVR) + Z (2) N ⊕ OVR (4) Z (6) OVR (8) LOW̄ (12) Z + C̄ (10) C (12) Z + C (14) N (16) QLINK (18) FLAG 1 (20) FLAG 2 (22) FLAG 3 | | | | |

The set status instructions specify (via instruction bits φ–4) which bit or group of bits, contained in the status register 72 (FIGS. 2 and 12), are to be set (forced to a ONE). The reset status instructions specify which bit or group of bits, contained in the status register 72 are to be reset (forced to ZERO).

The store status instruction contains two indicators: a byte/word mode and a second indicator (at instruction bits φ–4) that specifies the destination at which the content of the status register 72 is to be stored. The store status instruction allows the state of the processor unit 10 to be saved and restored later, which is an especially useful function for interrupt handling.

The Test Status instruction contains a single indicator in bits φ–4 which specifies which one of the twelve possible test conditions are to be placed on the condition-test (CT) output terminal. Besides the 8-bits of the status register 72 (FIG. 12: Z, C, N, OVR, QLINK, FLAG 1, FLAG 2 and FLAG 3), four logical functions (QN⊕QOVR, QN⊕QOVR+QZ, QZ+OVS/QC/ and LOW) may also be selected. These functions are useful in testing of twos complement and unsigned numbers.

The status register 72 may be tested, as mentioned above, via the bi-directional T bus.

D. Detailed Description:

Having described generally the data processor unit 10 with respect to FIG. 2, and the instruction set, a detailed description of certain of the elements of the invention can now be described and understood.

Control Bus: As mentioned above, each instruction cycle provides the instruction decode circuit 46 with a 16-bit instruction. In turn, the instruction decoder 46 decodes the instruction and issues a plurality of control signals on the control bus 47 that manipulate the data paths necessary to execute the instruction. Portions of the control bus 47 are communicated to all elements of the processor unit 10 (FIG. 2) and is a unidirectional conducting bus because information is transferred only from the instruction decoder 46 and to the respective elements of the processor unit 10.

As shown more specifically in FIG. 13, the control bus 47 comprises a plurality of connections each reserved for specific control signals that emanate from the instruction decoder 46. The control signals are conducted by the control bus 47 to destinations where they are used to control the data paths through various elements of the processor unit 10 to achieve the results directed by the particular decoded instruction.

FIG. 13 is presented primarily to illustrate the source of some of the more important control signals that are conducted on the control bus 47, their function being described with respect to the ultimate destination of the signals when discussing various detailed descriptions of certain of the circuit elements of the processor 10. For example, four signal lines 47a conduct the control signal OVS/FRSA/ , OVS/FRSB/ , OVS/FRSC/ and OVS/FRSD/ that, as will be seen, are applied to the ALU 62 to select the minterms that form the particular arithmetic or logical operation specified by an instruction. One or more of these control signals would be active (i.e. LOW), depending upon the instruction decoded by the instruction decoder 46.

Referring now to FIGS. 14 and 14A–14C, the R-MUX 58, S-MUX 59 and ALU 62 are illustrated in greater detail. It will be remembered that processor device 10 is intended to be a high performance, high speed unit. Accordingly, it is preferably fabricated as a bi-polar integrated circuit, using emitter coupled logic (ECL). It is well known that ECL technology permits the emitter leads of the output transistor stages of a number of gates to be connected together, performing the wired-OR function. The wired-OR function is used here.

Turning first to FIG. 14A, the R-MUX 58 is shown as comprising selection circuits 104, 106 and 108 and active LOW input AND gates 109, 110 and 112. The selection circuits operate to select certain signals and force predetermined ones of the 16 signal lines that make up the OVS/R/ bus 58a to a particular state. For example, the selection circuit 104 operates to provide the information that will be shifted into the vacant bit during shift instructions. It will be remembered that the information provided the vacant bit can be $\phi$, 1, or certain ones of the status register 72 outputs (i.e., the status-link (QL), the carry bit (QC), or the negative-status bit (QN) exclusive-ORed with the overflow-status bit (QOVR). Depending on the shift instruction decoded by the instruction decoder 46, one of the control signals shift carry (SHC), shift N exclusive-ORed with overlow (SHNOVR) or shift link (SHL) will be active on the control bus 47 (FIGS. 13 and 14A). Thus, bits $\phi$, 7 and 15 of the OVS/R/ BUS 58a will be forced to the same state as the QC output of the status register 72 if the SHC control signal is active via the AND gate 104d and OR gate 104e. The control signals that are applied to the selection circuit 104 are mutually exclusive; that is, if the control signal SHC is active, the control signals SNOVR and SHL are inactive. This is also true for the other control signals that are applied to the selection circuits 106 and 108 as well as the AND gates 110 and 112. Thus, all other bits of the OVS/R/ BUS 58a (i.e., bits 1-6 and 8-14) remain ZERO. As will be seen, the control signals applied to the S-MUX 59 will force a mask to be formed on the 16 signal lines that make up the OVS/S/ BUS that will select one of the bits $\phi$, 7 or 15 to be merged with the shifted operand (from barrel shifter 64). In similar fashion, the gating signals SHNOVR and SHL select the other inputs to force bits $\phi$, 7 and 15 of the OVS/R/ BUS to the appropriate state. Thus, the control signal SHNOVR enables the AND gate 104c to pass the output of the exclusive-NOR gate 104b, forcing the OVS/R/ BUS bits $\phi$, 7 and 15, via OR gate 104e to be (the complement of) the QN and QOVR outputs of the status register 72 or the QL output of the status register (representative of the QLINK signal).

The selection circuit 106 operates in response to the control signals $\overline{R\phi UB}$ and OVS/RDSE/ to perform the zero or sign extend function. It will be remembered that certain instructions apply an operand to the ALU 62 from the data latch 56 using only the low order 8 bits (bits $\phi$-7) and forcing the upper 8 bits to all ZEROs or extending the sign of the transferred byte by replicating bit 7 in the high order 8 bits transferred. For example, the single operand instruction referred to above (see Table I) specifies operand A as D($\phi$E) or D(SE) when the instruction bits 5-8 are a value of (9) or (10), respectively. These are the zero or sign extend instructions that perform the operation specified by the single operand instruction. When such an instruction is received and recognized by the instruction decoder 46, the control signal OVS/RDLB/ will become active (i.e., LOW) to enable the active LOW input AND gates 109, passing the lower order 8 bits of the data latch (D$_\phi$-D$_7$) to bits $\phi$-7 of the OVS/R/ BUS 58a. At the same time, if a zero extend instruction is decoded, the $\overline{R\phi UB}$ signal becomes active, forcing bits 8-15 of the OVS/R/ BUS 58a to ONEs. If the sign extend operation is called for, the OVS/RDSE/ signal becomes active to communicate the data bit D$_7$ from the data latch 56 to force, via the active LOW input AND gate 106b and OR gate 106c, forcing the bits 8-15 of the OVS/R/ BUS 58a to the (complement of) data bit D7. In the event that the entire word held in the data latch 56 is to be selected for communication on the OVS/R/ BUS 58a, the control signals OVS/RDUB/ and OVS/RDLB/ become active (i.e., LOW) to enable all the AND gates in blocks 108 and 109.

The active LOW input AND gate 109 (as do the gate circuits 110 and 112) represents eight individual AND gates (not shown), each receiving as an input one of the data bits (bits D$_\phi$-D$_7$) from the data latch 56 (FIG. 2). Another input of each individual AND gate receives the OVS/RDLB/ signal from the control bus 47. The received data bits (D$_\phi$-D$_7$) are gated to the corresponding bit lines (i.e., BITS $\phi$-7) of the OVS/R/ BUS when selected by the OVS/RDLB/ signal being low. The active LOW input AND gate 110 represents 16 individual AND gates each having as an input one of the data bit outputs (bits $\phi$-15) from the RAM latch 52. When the control signal OVS/RRAM/ becomes active, the content of the RAM latch 52 is gated to the OVS/R/ BUS 58a. Similarly, the active LOW input AND gate 112 is meant to represent 16 individual gates that, when enabled, communicate the accumulator signal lines 54a to the OVS/R/ BUS 58a.

Turning now to FIG. 14B the S-MUX 59 is illustrated. The enabling circuits 114 and 116 respectively receive the bus lines 52a and 54a from the RAM latch 52 and accumulator 54, and communicate them to the OVS/S/ BUS 59a when the OVS/SRAM/ or OVS/SACC/ control signals are active. In similar fashion, the enabling circuit 118 communicates the IBUS 42 to the OVS/S/ BUS 59a in response to an active OVS/SIN/ signal on the control bus 47.

The 16 active LOW input AND gates 120a-120p are used for the bit instruction (Table IV above). The bit instruction, it will be remembered is used to set or reset the N$^{th}$ bit to a ONE or a ZERO, as the case may be. When a bit instruction is decoded, the OVS/S/ $_N$ control signal of the control bus 47 is made active (i.e. LOW) and the corresponding one of the signal lines SC$_\phi$-SC$_{15}$ is made active, depending upon the value of N in the instruction word. For example, if bit 9 is to be set (i.e., N=9), the signals SC$_9$ and OVS/S/ $_N$ are made active by the decoder 46; the remaining signals (SC$_\phi$-SC$_8$ and SC$_{10}$-SC$_{15}$) are left inactive. This forces the bit 9 of the OVS/S/ BUS to the desired state (i.e., the complement of SC$_9$).

In the case of the shift instruction, the gates 124, 126 and 128 are used to form a mask on the OVS/S/ BUS that selects the particular one of bits $\phi$, 7 or 15 of the OVS/R/ BUS produced by the selection circuit 104. For example, assume that the shift instruction is operating in the byte mode and 1-bit down shift is to be performed. Assume further that the input is to be QN$\oplus$QOVR. The instruction decode circuit 46 would decode the instruction, and make active the signals SHNOVR and $\overline{S\phi7/15}$ (FIGS. 13, 14A and 14B). This forces bits $\phi$, 7 and 15 of the OVS/R/ BUS 58a at a state indicative of QN$\oplus$QOVR (FIG. 14A), while only bit 7 (via gate 128) of the OVS/S/ BUS 59a is in an active state, which will function as will be seen, to select bit 7 of the OVS/R/ BUS as an input to the vacated bit position. The shifted operand is supplied to the ALU 62 by the barrel shifter 64. The ALU 62 merges the OVS/R/ BUS 58a, OVS/S/ BUS 59a, and the shifted operand to obtain the shift designated by the instruction. The merging will be discussed further below.

The buffer gate 122 functions to receive the control signal $\overline{S\phi}$ from the control bus 47 to force all 16-bits (i.e., $\phi$-15) of the OVS/S/ BUS 59a to ONES. The buffer gate 124 receives control signal $\overline{S\phi\phi}$ to force bit φ of the OVS/S/ BUS to a ONE during single bit shift and CRC instructions. The buffer gate 126 and the active LOW input AND gate 128 receive the control signals $\overline{S\phi7/15}$ from the control bus 47. Buffer gate 126 forces bit 15 of the OVS/R/ BUS 59a to a HIGH or ONE when the $\overline{S\phi7/15}$ signal is active (i.e., during the single-bit shift and CRC instructions). The AND gate 128 also receives the $\overline{S\phi7/15}$ signal from the control bus 47 and, in conjunction with the instruction bit $i_{15}$ from the I bus 42, operates to force bit 7 of the OVS/S/ BUS 59a to the opposite state of $i_{15}$. The gates 126 and 128, together with the control signals $\overline{S\phi7/15}$ and $i_{15}$, form a mask used during execution of bit shift and CRC instruction executions.

The signals formed on the individual signal lines of the OVS/R/ BUS 58a and OVS/S/ BUS 59a are conducted to the ALU 62, combined (as directed by the particular instruction) with the information communicated to the U operand input of the ALU 62 by the bus lines 64a from the barrel shifter 64, and used to perform the arithmetic and/or logic operations directed by the decoded control signals that are communicated to the ALU 62 by control bus 47. The ALU 62 is shown in greater detail in FIG. 14C. As illustrated, the ALU 62 includes 16 individual logic modules (LM) 130a–130p, look ahead logic 132, and CRC control logic 134. Each of the LMs 130a–130p are identically structured, except for those corresponding to bits φ and 15 (i.e., LM 130a and LM 130p). The internal logic of the LM 130a–130p will be described with reference to FIG. 15 in greater detail below.

Each LM 130a–130p includes R, S and U operand inputs for receiving the corresponding bits of the OVS/R/ BUS, OVS/S/ BUS 58a and 59a and bus lines 64a from the barrel shifter 64. In addition, each LM 130a–130p has a control (CTL) input that receives control signals on signal line 135 from the CRC control logic 134, and a control bus (CB) input that receives signals communicated on the control bus 47. Finally, each LM 130a–130p also receives as inputs the CN and OVS/CN/ generated by the look ahead logic 132 and communicated on signal lines 136, 138, respectively. More properly, the lines 136 and 138 are each 16-bit buses having an individual line to each LM 130a–130p.

Each LM 130a–130p generates a propagate and generate signals at a propagate (P) and generate (G) outputs which are communicated to the look ahead logic 132 via 32 individual signal lines generally designated in FIG. 14C with the reference numeral 140. During arithmetic operations, a LOG control signal, conducted to the look ahead logic 132 via control bus 47, is made active. The active state of the LOG signal enables the look ahead logic 132 to receive the propagate and generate signals issued by each individual LM 130a–130p on the signal bus 140, determine whether a carry is generated by one LM stage that is to be applied to the next succeeding LM stage, and, if so, produce the appropriate signal at the CN and OVS/CN/ output, which are conducted to the LM 130a–130p via the signal buses 136, 138.

Turning now to FIG. 15, there is illustrated the circuitry of a representative one of the 16 LMs 130a–130p of the ALU 62, designated as 130'. As shown, the nth bit (n=φ–15) of the OVS/R/ BUS 58a (OVS/R/ $_n$) and OVS/S/ BUS 59a (OVS/S/ $_n$) are respectively coupled to the exclusive-OR gates 150 and 152. The exclusive-OR gates 150 and 152 also receive the control signals RINV and SINV from the control bus 47, respectively, which function to complement the OVS/R/ $_n$ and OVS/S/ $_n$ signals. Each of the exclusive-OR gates 150, 152 have a positive output lines 150a and 152a respectively, and negative outputs 150b and 152b. The positive outputs 150a and 152a are connected together in a wire-ORed configuration 153 which forms the complement of a carry generate signal line (OVS/G/ $_n$). The complements of a propagate carry signal is produced on the propagate carry signal line (OVS/P/ $_n$) by connecting the negative outputs 150b and 152b to the inputs of the NOR gate 120. The generate carry and propagate carry signals produced by each stage N are conducted on their respective signal lines $G_n$ and $P_n$, which form the 32-line bus 140 (FIG. 14C) to the input terminals look-ahead logic 124. As previously discussed, the look-ahead logic 124 is enabled by the active state of the LOG control signal to generate carry signals on the bus line 136n and 138n, representing a carry propagated from preceeding stage (n−1) and into the LM stage n of FIG. 15. When the LOG signal is inactive (i.e., a LOW) the look-ahead logic 124 force both the CN and OVS/CN/ signals to a LOW, enabling the LM stage to perform logic operations.

The negative output lines 150b and 152b of the exclusive-OR gates 150 and 152 are respectively connected to one of the two inputs of combination AND/NAND gates 156 and 158. The second of the two inputs of the respective combination AND/NAND gates 156, 158 are connected to the outputs of OR gates 160, 162 respectively. The OR gate 162 functions to bring in the shifted data bit (SHDATA$_n$) from the barrel shifter 64, which is then combined with the data bit communicated on the OVS/S/ BUS 59a (OVS/S/ $_n$) at the AND gate 158. The data bit conducted on the OVS/R/ BUS 58a is combined with SHDATA$_n$ and OVS/S/ n at the minterm selection gates 166a–166d. Appropriate selection and activation of the control signals OVS/FRSA/ –OVS/FRSD/ will effect the merging or comparing functions required by the rotate and compare and rotate and merge instructions.

The shifted data bit SHDATA$_n$ is provided only during the execution of the shift, rotate or CRC instructions. At all other times, the bus lines 64an are held LOW. When the shifted data bit, SHDATA$_n$ is present, the data bits communicated on the OVS/R/ BUS 58a and OVS/S/ BUS 59a provide the non-rotated operand and mask bits for the shift, rotate, rotate and merge, rotate and compare, or CRC instructions, described above with reference to Tables III, VI, VII, VIII, and IX, respectively.

Merging of the OVS/R/ $_n$, OVS/S/ $_n$, and SHDATA$_n$ bits is effected when the OVS/SHIFT/ signal from the control bus 47 is active (i.e., LOW) and the output line 135 from the CRC control logic 134 is also LOW—which is the case when a CRC instruction is not being executed. The OR gates 160 and 162 are thereby enabled to provide the nth LM stage of the ALU 62 the data bit SHDATA$_n$ from the barrel shifter 64. When a CRC instruction or instructions that use information provided by the barrel shifter 64 is not being executed, the OVS/SHIFT/ signal is inactive (i.e., HIGH) and the combination AND/NAND gates 156 and 158 function to merely communicate the received OVS/R/ $_n$ and OVS/S/ $_n$ to the four active LOW input AND gates 166a–166d. Both the true and the complement of the terms OVS/R/ $_n$ and OVS/S/ $_n$ are communicated from the AND/NAND gates 156, 158 via their respective positive and negative output lines 156a, 158a and 156b, 158b.

The AND gates 166a–166d, together with the OR gates 140a and 140b and the higher-ORed connection 142, are capable of producing the minterms (i.e., $R_nS_n$, $R_nOVS/S/_n$, $OVS/R/_nS_n$, and $OVS/R/_nOVS/S/_n$) necessary for any logical or arithmetic function to be performed by the ALU 62. Selection of the particular minterms necessary is effected by the control signals OVS/FRSA/, OVS/FRSB/, OVS/FRSC/, and OVS/FRSD/, communicated on the control bus 47.

For the execution of CRC instructions, those stages of the ALU 62 corresponding to bits 1–14 (i.e., LM 130b–130o) have the data bits $OVS/S/_1$–$OVS/S/_{14}$ of the OVS/S/ BUS 59a passed directly to the OR gate 160. However, data bits $\phi$ and 15 (i.e., $OVS/S/_\phi$ and $OVS/S/_{15}$) of the OVS/S/ BUS 59a are respectively applied to the exclusive-NOR gates 170 and 172 of the mask circuit 174. Exclusive-NOR gate 172 is found only in the stage of the ALU corresponding to bit $\phi$ (i.e., LM 130a); similarly, the exclusive-NOR gate 172 is only in LM 130p (bit 15 of the ALU 62). Applied to the second input of the exclusive-NOR gate 170 is a control signal OVS/CRCF/ signal from the control bus 47; and a OVS/CRCR/ control signal is the second input to the exclusive-NOR gate 172. The mask circuit 174 functions, in conjunction with the $\overline{S\phi\phi}$, $\overline{S\phi7/15}$ and $i_{15}$ control signals (FIG. 14B) and the CRC control logic to select a serial input for CRC calculations, as will be described below.

The CRC control logic 134 also uses the control signals OVS/CRCF/ and OVS/CRCR/ in conjunction with the least significant and most significant (RAM$\phi$ and RAM 15) data bits from the RAM latch 52 (FIG. 14C). The combinatorial logic circuit of the CRC control logic 134, comprising the four active LOW input NAND gates 180a–180d, the two exclusive-OR gates 182a, 182b and the wired-OR connection 184 functions to provide on the signal line 135 the exclusive-OR of QLINK (i.e., the QL output of the status register 72) and bit 15 (RAM 15) from the RAM latch 52 for CRC forward operations (cf. FIGS. 11A and 15); the active LOW input NAND gates 180a and 180b, together with the exclusive-OR gate 182a achieve this operation. For CRC reverse operation the CRC control logic 134 provides the exclusive-OR of QLINK and RAM $\phi$ via the active LOW input NAND gates 180a and 180d and the exclusive-OR gate 182d (cf. FIGS. 11B and 15).

A CRC forward operation proceeds as follows: The signal line 135 is coupled to every OR gate 160 of each LM 130a–130p. At the same time, the OVS/SHIFT/ signal, also supplied to the OR gates 160 of all the LM 130a–130p, is active (i.e., LOW). Further, the third input to the OR gate 160 comes from the OVS/S/ BUS 59a which, when not used, has all LOWs in all bit lines $OVS/S/_1$–$OVS/S/_{15}$. The $\overline{S\phi\phi}$ control signal (FIG. 14B) is active to force $OVS/S/_\phi$ HIGH. This is because a ZERO must be exclusive-ORed with the bit $\phi$ of the ANDed result of the polynomial bits from the accumulator 54 through the R-BUS 58a and the EX-OR result of QLINK and RAM 15 on the line 135. Thus, the $OVS/S/_\phi$ line signal to the OR gate 160 for LM 130a must pass through the exclusive-NOR gate 170 of mask circuit 174 and is thereby inverted during CRC forward operations because the OVS/CRCF/ control signal is a LOW, $OVS/S/_{100}$ also passes through the exclusive-NOR gate 152, is inverted (SINV is inactive for CRC forward) and is ANDed with SHDATA$_\phi$ at the AND gate 158.

The operation is essentially the same for CRC reverse, except that now a ZERO must be exclusive-ORed with bit 15 of the shifted operand from the barrel shifter 64 (SHDATA$_\phi$). The control signal $\overline{S\phi7/15}$ is now active (i.e. LOW), forcing $OVS/S/_{15}$ HIGH via the inverter 126 (FIG. 14B). The exclusive-NOR gate 172 (OVS/CRCR/ is LOW) inverts $OVS/S/_{15}$ to delete its effect at the OR gate 160 of the LM 130p which brings in the OVS/R/ BUS 58. $OVS/S/_{15}$ is also inverted by the exclusive-NOR gate 152 and combined with SHDATA$_{15}$ at the AND/NAND gate 158 to produce the minterms necessary for producing an exclusive-OR of ZERO with bit 15 of the ANDed result of the polynomial bits from the accumulator 54 through the R-bus 58a and the exclusive-OR result of QLINK and RAM$\phi$ on the line 135 (cf. FIG. 11B and FIG. 15).

Consider now operation of single-bit shift instruction execution. The operand to be shifted is passed through the barrel shifter 64 and communicated the ALU 62 on the bus lines 64a as SHDATA$_\phi$–SHDATA$_{15}$. The vacated bit position (bit $\phi$ for shift up; bits 7 or 15 for a shift down, depending upon whether operation is in the byte or word mode, respectively) is provided as follows: Bits $\phi$, 7 and 15 of the OVS/R/ BUS ($OVS/R/_\phi$, $OVS/R/_7$, $OVS/R/_{15}$) are forced to the desired state via the control signals SHL, SHC, SHNOVR and selection circuit 104 (FIG. 14A). As discussed, these signals are active when the shift instruction is to be executed and one of the QL, QC, or QN⊕QOVR outputs of the status register 72 is used to fill the bit position vacated by the shift. Formed on the OVS/S/ BUS 59a is a mask which selects one of the $OVS/R/_\phi$, $OVS/R/_7$, or $OVS/R/_{15}$ and inhibiting the merge of the other unselected bits with SHDATA$_\phi$–SHDATA$_{15}$. The remaining bit positions of the OVS/R/ BUS 58a, $OVS/R/_8$–$OVS/R/_{14}$ and $OVS/R/_8$–$OVS/R/_{14}$ are all LOW.

During a shift instruction one of the control signals $\overline{S\phi\phi}$ or $S\phi7/15$ will be active; $\overline{S\phi\phi}$ is active for a shift up and $S\phi7/15$ will be active for a shift down. $i_{15}$ will be active in the word mode. Thus, if a shift up instruction is executed, $S\phi\phi$ is active ($\overline{S\phi7/15}$ is inactive), forcing $OVS/S/_\phi$ of the OVS/S/ BUS 59a to a HIGH. All the remaining bits ($OVS/S/_1$–$OVS/S/_{15}$) remain LOW. The $OVS/S/_\phi$, in effect, enables the AND/NAND gate 160 (of LM 130a-bit $\phi$ of ALU 62) to select $OVS/R/_\phi$ of the OVS/R/ BUS 58a (the OVS/SHIFT/ signal is active, i.e., LOW, the output line 135 is LOW, and the signals SINV and RINV are used only to complement the input operands). The ZEROs in all remaining bits $OVS/S/_1$–$OVS/S/_{15}$ of the OVS/S/ BUS 59a disable the AND/NAND gates 160 of each corresponding LM 130b–130p, thereby inhibiting bits 7 and 15 ($OVS/R/_7$ and $OVS/R/_{15}$) of the OVS/R/ BUS 58a from getting into the ALU 62.

For shift-up operations, the mask is formed to select either $OVS/R/_7$ or $OVS/R/_{15}$ of the OVS/R/ BUS 58a in essentially the same manner: $\overline{S\phi\phi}$ is inactive; and $\overline{S\phi7/15}$ is active (i.e., LOW) in both word and byte modes. However, the control $i_{15}$ will be active (i.e., HIGH) in the word mode, effectively disabling the active LOW input AND gate 128. Thus, for a shift down in the word mode; bit 15 ($OVS/S/_{15}$) of the OVS/S/ BUS 59a will be forced HIGH to select $OVS/R/_{15}$ from the OVS/R/ BUS 58a. In the byte mode, $i_{15}$ is LOW, and both bits 7 and 15 ($OVS/S/_7$ and $OVS/S/_{15}$) of the OVS/S/ BUS 59a are forced HIGH.

However, it will be remembered that when executing instructions in the byte mode, only the lower-order eight bits are stored. Thus, it does not matter what bit 15 of the result is.

It should now be evident that the processor of the present invention, structured as described above, is capable of executing complex instructions, including shift instructions, in essentially the time period (i.e., instruction cycle) used for all instructions. The barrel shifter is used only for shift instructions and, in effect, removed from the data path when not required (by passing operands to the ALU 62 through the RMUX and SMUX 58 and 59, respectively).

The remaining logic elements utilized by the processor device 10, and shown in FIG. 2, are of conventional design and can easily be constructed in accordance with the above description of FIG. 2 and the instructions themselves. The priority encoder 78, for example, is merely a combinational logic circuit that accepts a 16-bit word and produces therefrom a 5-bit code indicative of the highest order ONE.

The barrel shifter 64 is also a combinatorial logic circuit that accepts a 16-bit data word and shifts the word $\phi$ to 15 places, up or down, as determined by control signals communicated to the barrel shifter 64 on the control bus 47, specifying N (the number of shifts). The barrel shifter 64 may be implemented using the description of the 4-bit shifter described in the publication entitled "Schottky and Low Power Schottky Data Book", published by Advanced Micro Devices, Inc., in 1978.

We claim:

1. In a microcomputer system, including memory means for storing a plurality of multi-bit instruction words and sequencer means coupled to said memory means for controlling the sequence of instructions accessed from said memory means, a processor device coupled to said memory means and responsive to said instruction words for receiving and processing data words, the processor device comprising:
   decoder means for receiving said instruction words and for generating therefrom a plurality of control signals;
   storage means for temporarily storing said data words, said storage means including at least a first and a second memory element;
   arithmetic-logic means having first, second, and third operand inputs operably coupled to said storage means for receiving said stored data words at said operand inputs and selectively performing arithmetic and logic operations thereon in response to said control signals;
   combinatorial logic means interconnecting said storage means and only said third operand input for receiving and shifting stored data words; and
   first multiplex means for selectively communicating said first and second memory elements to said first and second operand inputs and to said combinatorial logic means.

2. The processor device of claim 1, wherein the combinatorial logic means includes means for circular shifting said received stored data words.

3. The processor device of claim 1, further comprising priority encoding means for selectively receiving a selected one of said stored data words and issuing a prioritization word indicative of the bit position of the highest order ONE contained in said selected data word in a single clock cycle.

4. The processor device of claim 3, wherein said arithmetic-logic means is capable of masking selected bits of said selected data word, said priority encoding means receiving the unselected bits of said selected data word from said arithmetic-logic means so that said priority encoding means issues a prioritization word indicative of the bit position of the highest ONE contained in the unselected bits in said selected data word.

5. The processor device of claim 1, further comprising input means for receiving and communicating instruction words to said first multiplex means said first multiplex means including further means for selectively communicating said input means to said first and second operand inputs and to said combinatorial logic means.

6. The processor device of claim 1, wherein said instruction words are 16-bits, and wherein said decoder means includes means for selectively processing 16-bit data words in response to a predetermined one bit of said instruction being set to a first state and for processing 8-bit data words in response to said predetermined bit being set to a second state.

7. The processor device of claim 1 wherein said arithmetic-logic means performs arithmetic and logic operations in a single clock cycle.

8. The processor device of claim 1 further comprising:
   register means coupled to said arithmetic-logic means for temporarily storing signals indicative of the status of operations of said arithmetic-logic means; and
   second multiplex means for selectively coupling said arithmetic-logic means output and said register means to said storage means.

9. In a microprocessor system, including memory means for storing a plurality of multi-bit instruction words and sequencer means coupled to said memory means for controlling the sequence of instructions accessed from said memory means, a processor device coupled to said memory means and responsive to said instruction words for receiving and processing data words, the processor device comprising:
   decoder means for receiving said instruction words and for generating therefrom a plurality of control signals;
   storage means for temporarily storing said data words, said storage means having first and second memory elements;
   arithmetic-logic means having first, second and third operand inputs operably coupled to said storage means for receiving said stored data words at said operand inputs and selectively performing in a single clock cycle arithmetic and logic operations thereon in response to said control signals, wherein in a three-operand input operation performance, said third operand operates on both said first and second operands;
   combinatorial means interconnecting said storage means and only said third operand input for receiving and shifting said stored data words, said combinatorial logic means further including means for circular shifting said received stored data words; and
   multiplex means for selectively communicating said first and second memory elements to said first and second operand inputs and to said combinatorial logic means.

10. The processor device of claim 9 further comprising:

input means for receiving and communicating instruction words to said multiplex means, said multiplex means having further means for selectively communicating said input means to said first and second operand inputs and to said combinatorial logic means.

11. The processor device of claim 9, further comprising priority encoding means for selectively receiving a selected one of said stored data words and issuing a priorization word indicative of the bit position of the highest order ONE contained in said selected data word in a single clock cycle.

12. In a microprocessor system, including memory means for storing a plurality of multi-bit instruction words and sequencer means coupled to said memory means for controlling the sequence of instructions accessed from said memory means, a processor device coupled to said memory means and responsive to said instruction words for receiving and processing data words, the processor device comprising:
 decoder means for receiving said instruction words and for generating therefrom a plurality of control signals;
 arithmetic-logic means having first, second and third operand inputs for receiving said data words at said operand inputs and selectively performing arithmetic and logic operations thereon in response to said control signals, said arithmetic and logic operations results appearing at an output;
 a RAM, coupled to said arithmetic-logic means operand inputs and output, for holding said data words to and from said arithmetic-logic means;
 an accumulator register, coupled to said arithmetic-logic means operand inputs and output, for holding said data words to and from said arithmetic-logic means;
 a data storage latch, coupled to said arithmetic-logic means operand inputs and output, for holding data words to and from said arithmetic-logic means, said data storage latch further coupled to a data bus for holding data said words from said data bus;
 combinatorial logic means connected to said third operand input only; and
 multiplex means for selectively coupling said RAM and said accumulator register to said first and second operand inputs and to said combinatorial logic means.

13. The processor device of claim 12 wherein memory locations in said RAM for said data words are identified by address signals in said instruction words.

14. The process device of claim 13 wherein said multiplex means comprises:
 first multiplex means for selectively coupling said RAM, said accumulator register and said data storage latch to said first operand input of said arithmetic-logic means responsive to said control signals;
 second multiplex means for selectively coupling said RAM and said accumulator register to said second operand input of said arithmetic-logic means responsive to said control signals; and
 third multiplex means for selectively coupling said RAM, said accumulator register, and said data storage latch to said third operand input of said arithmetic-logic means through said combinatorial logic means responsive to said control signals.

15. The processor device of claim 14 wherein said second multiplex means also receives instruction words for selectively communicating said instruction words to said second operand input responsive to said control signals.

* * * * *

UNITED STATES PATENT AND TRADEMARK OFFICE
CERTIFICATE OF CORRECTION

PATENT NO. : 4,467,444

DATED : August 21, 1984

INVENTOR(S) : William J. Harmon, Jr. and John R. Mick

It is certified that error appears in the above-identified patent and that said Letters Patent is hereby corrected as shown below:

Column 1, line 4, (IMMEDIATELY AFTER THE TITLE) PROCESSOR UNIT FOR MICROCOMPUTER SYSTEMS, insert --A portion of this patent document contains material which is subject to copyright protection. The copyright owner has no objection to the facsimile reproduction by anyone of the patent document or the patent disclosure as it appears in the Patent and Trademark Office Patent file or records, but otherwise reserves all copyrights whatsoever.--

Column 10, after line 27, below "C. Instruction Set", insert --Copyright 1981 Advanced Micro Devices, Inc.--

Signed and Sealed this

Twenty-ninth Day of November, 1988

*Attest:*

DONALD J. QUIGG

*Attesting Officer*    *Commissioner of Patents and Trademarks*